(12) United States Patent
Lee

(10) Patent No.: US 12,549,777 B2
(45) Date of Patent: Feb. 10, 2026

(54) VIDEO DECODING DEVICE, OPERATING METHOD THEREOF, DISPLAY DEVICE, AND VIDEO SYSTEM

(71) Applicant: SAMSUNG ELECTRONICS CO., LTD., Suwon-si (KR)

(72) Inventor: Miyeon Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 88 days.

(21) Appl. No.: 18/214,112

(22) Filed: Jun. 26, 2023

(65) Prior Publication Data

US 2024/0080499 A1    Mar. 7, 2024

(30) Foreign Application Priority Data

Sep. 5, 2022  (KR) .................. 10-2022-0112338
Nov. 14, 2022 (KR) .................. 10-2022-0151989

(51) Int. Cl.
| | | |
|---|---|---|
| *H04N 19/96* | (2014.01) | |
| *H04N 19/124* | (2014.01) | |
| *H04N 19/159* | (2014.01) | |
| *H04N 19/513* | (2014.01) | |

(52) U.S. Cl.
CPC ........... *H04N 19/96* (2014.11); *H04N 19/124* (2014.11); *H04N 19/159* (2014.11); *H04N 19/513* (2014.11)

(58) Field of Classification Search
CPC .... H04N 19/96; H04N 19/124; H04N 19/159; H04N 19/513
See application file for complete search history.

(56) References Cited

U.S. PATENT DOCUMENTS

| | | | |
|---|---|---|---|
| 6,330,665 B1* | 12/2001 | Wise | G06F 12/0207 711/E12.003 |
| 8,005,147 B2 | 8/2011 | Alvarez et al. | |
| 10,009,602 B2 | 6/2018 | Kimura et al. | |
| 10,812,797 B2 | 10/2020 | Zhao et al. | |
| 11,363,285 B2 | 6/2022 | Li et al. | |
| 2002/0009149 A1* | 1/2002 | Rodriguez | H04N 21/4516 725/87 |
| 2011/0317762 A1* | 12/2011 | Sankaran | H04N 19/188 370/477 |

(Continued)

FOREIGN PATENT DOCUMENTS

| | | | | |
|---|---|---|---|---|
| EP | 3416397 A1 * | 12/2018 | | H04N 21/435 |
| JP | 6838888 B2 | 3/2021 | | |

OTHER PUBLICATIONS

Extended European Search Report dated Feb. 19, 2024 in European Application No. 23190423.6.

(Continued)

*Primary Examiner* — Dave Czekaj
*Assistant Examiner* — Shanika M Brumfield
(74) *Attorney, Agent, or Firm* — Sughrue Mion, PLLC

(57) ABSTRACT

A video decoding device includes a decoder including plural hardware blocks that perform decoding processing on a bitstream by pipeline units and plural pipeline memories disposed between the hardware blocks and that store unit data, obtained through processing performed by pipeline units by the hardware blocks, for each pipeline stage, and a memory that stores image data obtained through decoding by the decoder.

19 Claims, 29 Drawing Sheets

(56) References Cited

U.S. PATENT DOCUMENTS

| | | | |
|---|---|---|---|
| 2013/0058412 A1* | 3/2013 | Chen | H04N 19/61 |
| | | | 375/240.12 |
| 2013/0188723 A1 | 7/2013 | Tanaka et al. | |
| 2020/0112735 A1* | 4/2020 | Xu | H04N 19/132 |
| 2020/0404298 A1* | 12/2020 | Kuo | H04N 19/132 |
| 2020/0404312 A1* | 12/2020 | Kuo | H04N 19/176 |
| 2021/0250583 A1 | 8/2021 | Zhao et al. | |
| 2021/0306679 A1 | 9/2021 | Rosewarne et al. | |
| 2021/0377526 A1* | 12/2021 | Lee | H04N 19/96 |
| 2021/0400275 A1 | 12/2021 | De Lagrange et al. | |

OTHER PUBLICATIONS

"Meeting report of the 19th JVET meeting and 40th JCT-VC meeting", 132. MPEG Meeting; Oct. 12, 2020-Oct. 16, 2020; Online; (Motion Picture Expert Group or ISO/IEC JTC1/SC29/WG11), , No. nl9820 Jan. 12, 2021 (Jan. 12, 2021), XP030291642, Retrieved from the Internet: URL: https://dms.mpeg.expert/doc_end_user/documents/132_Online/wg11/MDS19820_Convenor_N00026.zipWG5_N0026_NVET_JCTVC_2020-06_mtgs.docx, pp. 1-274 (274 pages total).

Zhou et al., "An 8K H.265/HEVC Video Decoder Chip With a New System Pipeline Design," IEEE Journal of Solid-Slate Circuits, Nov. 2016, Total 15 pages.

\* cited by examiner

FIG. 5

| | PSTG 1 | PSTG 2 | PSTG 3 | PSTG 4 | PSTG 5 | PSTG 6 | PSTG 7 |
|---|---|---|---|---|---|---|---|
| BITSTREAM PARSING | UD 1 | UD 2 | UD 3 | UD 4 | UD 5 | UD 6 | UD 7 |
| IQT MV | | UD 1 | UD 2 | UD 3 | UD 4 | UD 5 | UD 6 |
| INTRA MODE MC | | | UD 1 | UD 2 | UD 3 | UD 4 | UD 5 |
| INTER PREDICTION INTRA PREDICTION & RECON | | | | UD 1 | UD 2 | UD 3 | UD 4 |
| LOOP FILTER | | | | | UD 1 | UD 2 | UD 3 |

UNIT PIXEL GROUP(UPXG)

UNIT PIXEL GROUP(UPXG)

Coding Unit(CU)  Pipeline Area Unit(PAU)

FIG. 12

| VALUE OF PAU_NUM_IN_CTU | THE NUMBER OF PAU in CTU | DESCRIPTION |
| --- | --- | --- |
| 0x00 | 1 | THE NUMBER OF CTU = THE NUMBER OF PAU |
| 0x01 | 2 | A CTU IS DIVIDED INTO TWO PAUs WITH THE SAME AREA |
| 0x02 | 4 | A CTU IS DIVIDED INTO FOUR PAUs WITH THE SAME AREA |
| 0x03 | 8 | A CTU IS DIVIDED INTO EIGHT PAUs WITH THE SAME AREA |

FIG. 13

| PAU_MODE | QUAD (0x00) | HOR (0x01) | VER (0x02) | ELSE (0x03) |
|---|---|---|---|---|
| EXAMPLE METHODS OF DIVIDING PAU (IF SIZE OF CU IS GREATER THAN SIZE OF PAU) | ⊞ | ☐☐ ☐☐☐ | ☐ ☰ | 1) QUAD or HOR (IF HORIZONTAL LENGTH OF CU IS EQUAL TO VERTICAL LENGTH OF CU) 2) VER (IF HORIZONTAL LENGTH OF CU IS LONGER THAN VERTICAL LENGTH OF CU) 3) HOR (IF VERTICAL LENGTH OF CU IS LONGER THAN HORIZONTAL LENGTH OF CU) |

VIDEO DECODING DEVICE, OPERATING METHOD THEREOF, DISPLAY DEVICE, AND VIDEO SYSTEM

CROSS-REFERENCE TO RELATED APPLICATION

This application is based on and claims priority under 35 U.S.C. § 119 to Korean Patent Application No. 10-2022-0112338, filed on Sep. 5, 2022 and to Korean Patent Application No. 10-2022-0151989, filed on Nov. 14, 2022, in the Korean Intellectual Property Office, the disclosures of each of which being incorporated by reference herein in their entireties.

BACKGROUND

The present disclosure relates to an electronic device, and more particularly, to a video decoding device for performing a decoding operation by pipeline units, an operating method thereof, a display device, and a video system.

In a case where an image or sound is transformed into digital data, the amount of digital data is very large. Decompressed digital data occupies a large storage space. Therefore, a technology for compressing digital data and decompressing compressed digital data is needed.

Recently, based on a new video compression standard (for example, versatile video coding (VVC)), a processing unit of a block has become more diversified, a motion estimation and compensation method has become more complicated than that in the related art, and the amount of memory access needed for motion compensation has increased over that used in the related art. Therefore, an efficient memory access method is needed in video decoders.

SUMMARY

It is an aspect to provide a video decoding device for performing a decoding operation by using a relatively small pipeline memory, an operating method thereof, a display device, and a video system.

According to an aspect of one or more embodiments, there is provided a video decoding device comprising a decoder including a plurality of hardware blocks configured to perform decoding processing on a bitstream by pipeline units, and a plurality of pipeline memories disposed between the plurality of hardware blocks and configured to store, for each pipeline stage, unit data processed in the pipeline units by the plurality of hardware blocks; and a memory configured to store image data decoded by the decoder, wherein the unit data comprises current coding unit (CU) size information representing a size of a current CU including unit pixel groups corresponding to a pipeline area unit among a plurality of unit pixel groups included in a coding tree unit (CTU), next CU position information representing a position of a CU next to the current CU including the unit pixel groups, and scan type information representing a scan type of a unit pixel group.

According to another aspect of one or more embodiments, there is provided an operating method of a video decoding device, the operating method comprising during a first pipeline stage, processing first unit data of a bitstream which is divided by pipeline units in the first pipeline stage and storing the first unit data in a first pipeline memory by a first hardware block; and during a second pipeline stage immediately following the first pipeline stage in time, processing second unit data divided by pipeline units in the second pipeline stage and storing the second unit data in the first pipeline memory by the first hardware block; and simultaneously with processing the second unit data by the first hardware block, reading and processing the first unit data stored in the first pipeline memory by a second hardware block.

According to yet another aspect of one or more embodiments, there is provided a video system comprising a video encoding device configured to provide a bitstream including pipeline area unit information about a pipeline area unit; and a video decoding device configured to decode the bitstream and output decoded image data. The video decoding device comprises a plurality of hardware blocks configured to process unit data divided by pipeline units; and a plurality of pipeline memories each having a memory size corresponding to the pipeline area unit information, the plurality of pipeline memories being configured to store the unit data that is processed.

According to yet another aspect of one or more embodiments, there is provided a display device comprising a decoder including a plurality of hardware blocks configured to perform decoding processing on a bitstream by pipeline units and a plurality of pipeline memories disposed between the plurality of hardware blocks and configured to store unit data, corresponding to a pipeline area unit provided from the plurality of hardware blocks, for each pipeline stage: a memory configured to store image data obtained through decoding by the decoder; and a display module configured to display an image based on the image data.

BRIEF DESCRIPTION OF THE DRAWINGS

Various embodiments will be more clearly understood from the following detailed description taken in conjunction with the accompanying drawings, in which:

FIG. 5 is a diagram for describing a decoding processing operation by pipeline units, according to some embodiments;

FIG. 12 is a diagram for describing pipeline area unit number information according to some embodiments;

FIG. 13 is a diagram for describing pipeline area unit mode information according to some embodiments;

DETAILED DESCRIPTION

Hereinafter, various embodiments will be described in detail with reference to the accompanying drawings.

Figure 1:
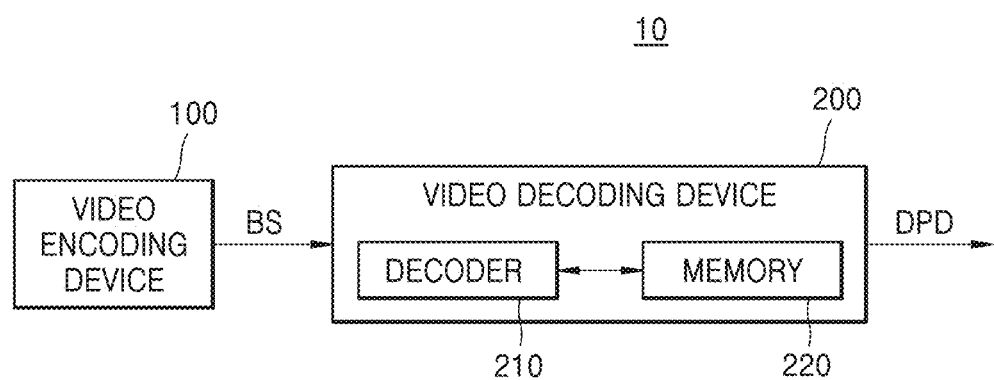
FIG. 1 is a block diagram of a video system according to some embodiments.

FIG. 1 is a block diagram of a video system 10 according to some embodiments.

Referring to FIG. 1, the video system 10 may include a video encoding device 100 and a video decoding device 200.

The video encoding device 100 may encode video data and may transmit an encoded bitstream BS. In some embodiments, the encoding may include compression and transcoding. The video encoding device 100 may be implemented as electronic devices, such as computers, portable phones, glasses, and watches, each including a camera having a photographing function. In this case, the video encoding device 100 may encode video data generated by photographing. In some embodiments, the video encoding device 100 may receive video data from a server or another electronic device and may encode the received video data. A video expressed by video data may be referred to as an image or a picture.

The video encoding device 100 may encode the video data. The video encoding device 100 may compress the video data so as to decrease a capacity of the video data. The video encoding device 100 may quantize transformed video data. The video encoding device 100 may generate a bitstream BS by using the quantized video data. The video encoding device 100 may transmit the bitstream BS to the video decoding device 200 through wired communication or wireless communication.

In some embodiments, the bitstream BS may include pipeline area unit information about a pipeline area unit. An embodiment of the bitstream BS is described below with reference to FIG. 11.

The video decoding device 200 may decode the encoded bitstream BS to provide an image to a user. The video decoding device 200 may decode the bitstream BS to restore video data. The video decoding device 200 may output decoded image data DPD. The decoded image data DPD may be provided to a device (for example, a display device) which may display an image.

The video decoding device 200 may include a decoder 210 and a memory 220.

The decoder 210 may decompress the bitstream BS to restore the video data. The decoder 210 may extract transformation coefficients by using the bitstream BS received thereby and may perform an inverse transformation and inverse quantization operation on the extracted transformation coefficients to restore the video data. The transformation coefficients may be coefficients obtained by transforming coefficients, included in the bitstream BS, into a two-dimensional (2D) form.

In some embodiments, the decoder 210 may decode the bitstream BS by pipeline units and may output decoded image data DPD. In some embodiments, data obtained through decoding performed by pipeline units may be referred to as unit data. Unit data according to some embodiments may correspond to a pipeline area unit. The pipeline area unit may be a region which corresponds to a pipeline unit having a predetermined size or includes a predetermined number of unit pixel groups. One or more pipeline area units may be included in one coding tree unit (CTU). The pipeline area unit is described below with reference to FIGS. 8A to 8E.

The decoder 210 may be implemented by one or more processors. The decoder 210 may be a program embedded in a processor.

The memory 220 may store the decoded image data DPD. The memory 220 may store reference image data which is used for the decoder 210 to compensate for a motion. The memory 220 may store data representing a reference pixel value used in the decoder 210.

The memory 220 may store a program and data for supporting various functions of the video decoding device 200, store pieces of input/output data, and store a plurality of application programs or applications driven by the video decoding device 200 and pieces of data and instructions for an operation of the video decoding device 200.

The memory 220 may include at least one type of storage medium of flash memory, random access memory (RAM), static random access memory (SRAM), programmable read-only memory (PROM), and/or a magnetic memory.

Figure 2:
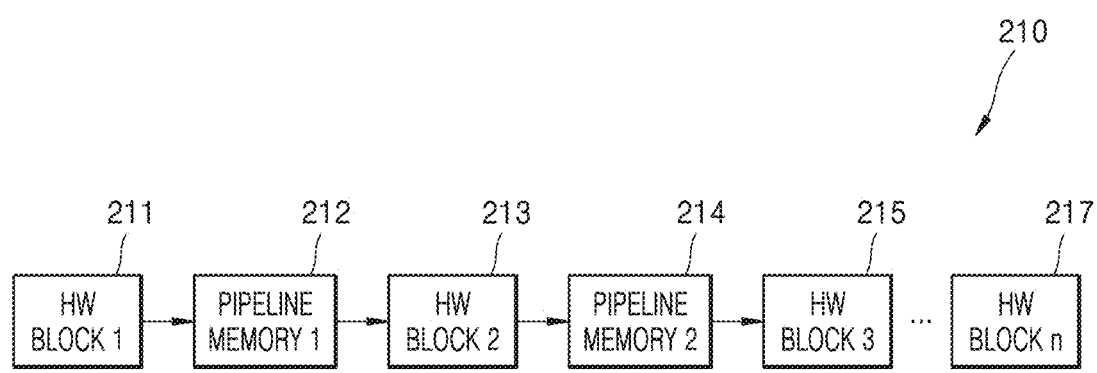
FIG. 2 is a block diagram of a decoder according to some embodiments.

FIG. 2 is a block diagram of a decoder 210 according to some embodiments.

Referring to FIG. 2, the decoder 210 may include a plurality of hardware blocks 211, 213, 215, and 217 and a plurality of pipeline memories 212 and 214.

The plurality of hardware blocks 211, 213, 215, and 217 may perform decoding processing on unit data divided by pipeline units. The decoding processing may be an operation of processing the unit data based on a unique function of each hardware block. Each of the plurality of hardware blocks 211, 213, 215, and 217 may be a hardware element which performs a unique function. The number of hardware blocks 211, 213, 215, and 217 may be n. In some embodiments, n may be an integer of 2 or more.

Each of the plurality of hardware blocks 211, 213, 215, and 217 may store (or write) processed unit data in a corresponding pipeline memory. Each of the plurality of hardware blocks 211, 213, 215, and 217 may read unit data stored in a corresponding pipeline memory and may perform decoding processing on the read unit data. To this end, each of the plurality of hardware blocks 211, 213, 215, and 217 may include direct memory access (DMA) capable of accessing one or more corresponding pipeline memories and an engine performing a unique function.

The plurality of pipeline memories 212 and 214 may store unit data obtained through processing by the plurality of hardware blocks 211, 213, 215, and 217. The plurality of pipeline memories 212 and 214 may output the unit data obtained through processing by the plurality of hardware blocks 211, 213, 215, and 217. In some embodiments, in a certain pipeline stage, the plurality of pipeline memories 212 and 214 may store certain unit data, and simultaneously, may output other unit data which is previously stored. A pipeline stage may denote an operation phase and an operation period where the decoder 210 performs a decoding operation by pipeline units.

A pipeline unit may be a unit of unit data which is input or output to or from each pipeline memory. A pipeline unit may be referred to as a virtual pipeline data unit (VPDU).

The number of pipeline memories 212 and 214 may be m. In some embodiments, m may be an integer which is less than or equal to n. In some embodiments, each of the plurality of pipeline memories (for example, a first pipeline memory 212 and a second pipeline memory 214) may be arranged (or disposed) between two adjacent hardware blocks of the plurality of hardware blocks (for example, a first hardware block 211, a second hardware block 213, a third hardware block 215, and an nth hardware block 217). For example, in an embodiment, the first pipeline memory 212 may be disposed between the first hardware block 211 and the second hardware block 213, the second pipeline memory 214 may be disposed between the second hardware block 213 and the third hardware block 215, and so on. A pipeline memory (not shown) may also be disposed between an n−1th hardware block (not shown) and an nth hardware block 217. As described above, at least one pipeline memory may be disposed between two different hardware blocks.

In some embodiments, the plurality of pipeline memories 212 and 214 may each have a memory size corresponding to pipeline area unit information included in a bitstream BS so as to store unit data. For example, when the pipeline area unit information includes a size of a pipeline area unit corresponding to 32*32 pixels (or referred to as 32*32 number of pixels) in one CTU, each of the plurality of pipeline memories 212 and 214 may have a memory size corresponding to 32*32 pixels. However, embodiments are not limited thereto.

In some embodiments, the plurality of pipeline memories 212 and 214 may store unit data, obtained through processing performed by pipeline units by the plurality of hardware blocks 211, 213, 215, and 217, for each pipeline stage.

In some embodiments, the plurality of pipeline memories 212 and 214 may store unit data, corresponding to a pipeline area unit provided from the plurality of hardware blocks 211, 213, 215, and 217, for each pipeline stage.

Each of the plurality of pipeline memories 212 and 214 may be implemented as RAM or SRAM, but embodiments are not limited thereto.

As described above, since a decoding operation is performed by relatively small pipeline units regardless of a video compression scheme or a tree division mode, a size and a storage capacity of a pipeline memory may be reduced.

Figure 3A:
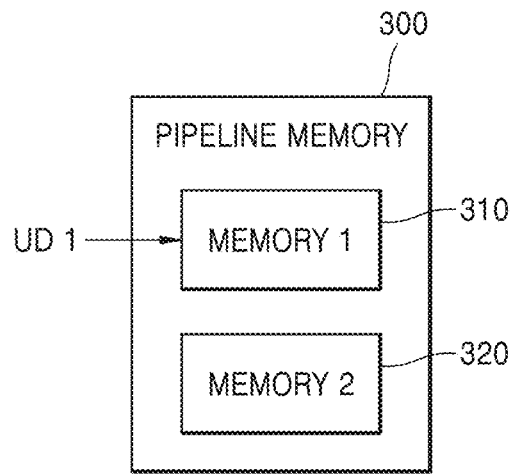
FIGS. 3A to 3C are diagrams for describing a pipeline memory according to some embodiments.
Figure 3B:
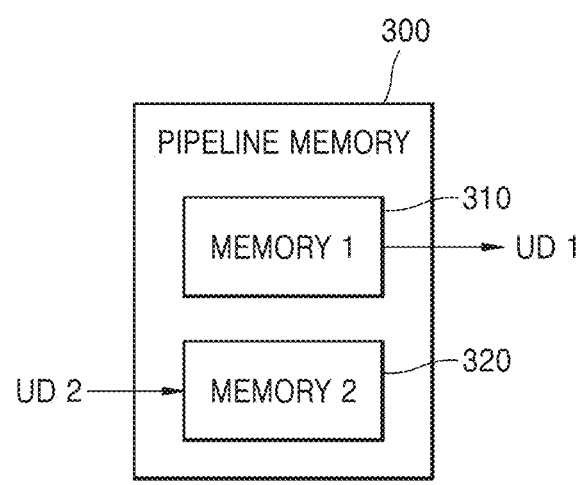
Figure 3C:
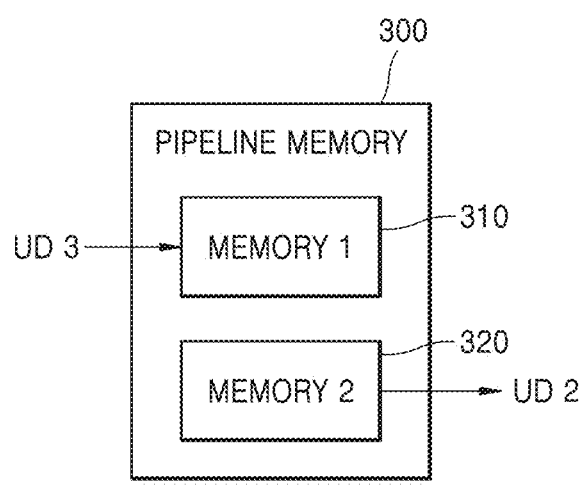

FIGS. 3A to 3C are diagrams for describing a pipeline memory according to some embodiments. In detail, FIG. 3A is a diagram illustrating a pipeline memory operating in a certain pipeline stage, FIG. 3B is a diagram illustrating a pipeline memory operating in a pipeline stage next to the certain pipeline stage, and FIG. 3C is a diagram illustrating a pipeline memory operating in a pipeline stage next to the pipeline stage of FIG. 3B. For example, in an embodiment, FIGS. 3A-3C may illustrate an operation of the first pipeline memory 212 through three successive pipeline stages that succeed each other.

Referring to FIG. 3A, a pipeline memory 300 may be disposed between different hardware blocks. For example with reference to FIG. 2, the pipeline memory 300 may be the first pipeline memory 212 disposed between the first hardware block 211 and the second hardware block 213. However, embodiments are not limited thereto.

In some embodiments, the pipeline memory 300 may include a first memory 310 and a second memory 320. Each of the first memory 310 and the second memory 320 may store unit data. Each of the first memory 310 and the second memory 320 may output the unit data stored therein.

In some embodiments, in a certain pipeline stage, a hardware block disposed at a front end of the pipeline memory 300 may process first unit data UD 1. The pipeline memory 300 may be provided with the first unit data UD 1 from the hardware block disposed at the front end of the pipeline memory 300. For example, it may be assumed that the pipeline memory 300 is the first pipeline memory 212. In the first pipeline stage, the pipeline memory 300 may be provided with the first unit data UD 1 obtained through processing by the first hardware block 211. The first hardware block 211 may store the first unit data UD 1 in the first memory 310. In an embodiment, the second memory 320 may be empty. When the second memory 320 is empty, a hardware block (for example, the second hardware block 213) disposed at a rear end of the pipeline memory 300 may wait for unit data. However, embodiments are not limited thereto, and in other embodiments, unit data obtained through processing by the hardware block (for example, the first hardware block 211) disposed at the front end of the pipeline memory 300 may be stored in the second memory 320.

Referring to FIG. 3B, in a pipeline stage after a certain pipeline stage, a hardware block disposed at a front end of a pipeline memory 300 may process second unit data UD 2. The pipeline memory 300 may be provided with the second unit data UD 2. For example, it may be assumed that the pipeline memory 300 is a first pipeline memory 212. In a second pipeline stage, the pipeline memory 300 may be provided with the second unit data UD 2 obtained through processing by the first hardware block 211. The first hardware block 211 may store the second unit data UD 2 in the second memory 320. Furthermore, a hardware block disposed at a rear end of the pipeline memory 300 may read unit data that was stored in the pipeline memory 300 in a previous pipeline stage. For example, it may be assumed that the pipeline memory 300 is the first pipeline memory 212. In the second pipeline stage, the second hardware block 213 may read first unit data UD 1 stored in the first memory 310 and may process the first unit data UD 1. In an embodiment, an operation of storing the second unit data UD 2 in the second memory 320 and an operation of outputting the first unit data UD 1 from the first memory 310 may be simultaneously executed. In detail, for example, the first hardware block 211 may process the second unit data UD 2 to store the processed second unit data UD 2 in the second memory 320, and simultaneously, the second hardware block 213 may process the first unit data UD 1. In some embodiments, the first hardware block 211 may process the second unit data UD 2 and store the processed second unit data UD 2 in the second memory 320, and simultaneously, the second hardware block 213 may read the first unit data UDI from the first memory 310 and process the first unit data UD 1.

Referring to FIG. 3C, in a pipeline stage after the pipeline stage of FIG. 3B, a hardware block disposed at a front end of a pipeline memory 300 may process third unit data UD 3. The pipeline memory 300 may be provided with the third unit data UD 3. For example, it may be assumed that the pipeline memory 300 is a first pipeline memory 212. In a third pipeline stage, the pipeline memory 300 may be provided with the third unit data UD 3 obtained through processing by a first hardware block 211. The first hardware block 211 may store the third unit data UD 3 in the first memory 310. In this case, the first unit data UD 1 stored in the first memory 310 in the pipeline stage of FIG. 3A may be erased. That is, the third unit data UD 3 may overwrite the first unit data UD 1 in the first memory 310. Furthermore, a hardware block (for example, a second hardware block 213) disposed at a rear end of the pipeline memory 300 may read the second unit data UD 2 stored in the second memory 320 and may process the second unit data UD 2. At this time, an operation of storing the third unit data UD 3 in the first memory 310 and an operation of outputting the second unit data UD 2 from the second memory 320 may be simultaneously executed.

The above description of FIGS. 3A-3C was made using the first pipeline memory 212 by way of example. However, one of ordinary skill in the art will understanding that the second pipeline memory 214 to mth pipeline memory operate in a similar manner through the three successive pipeline stages. Herein, 'first', 'second', and 'third' used above with reference to FIGS. 3A to 3C may be for differentiating elements and terms, and the order thereof is not limited by 'first', 'second', and 'third'.

Figure 4:
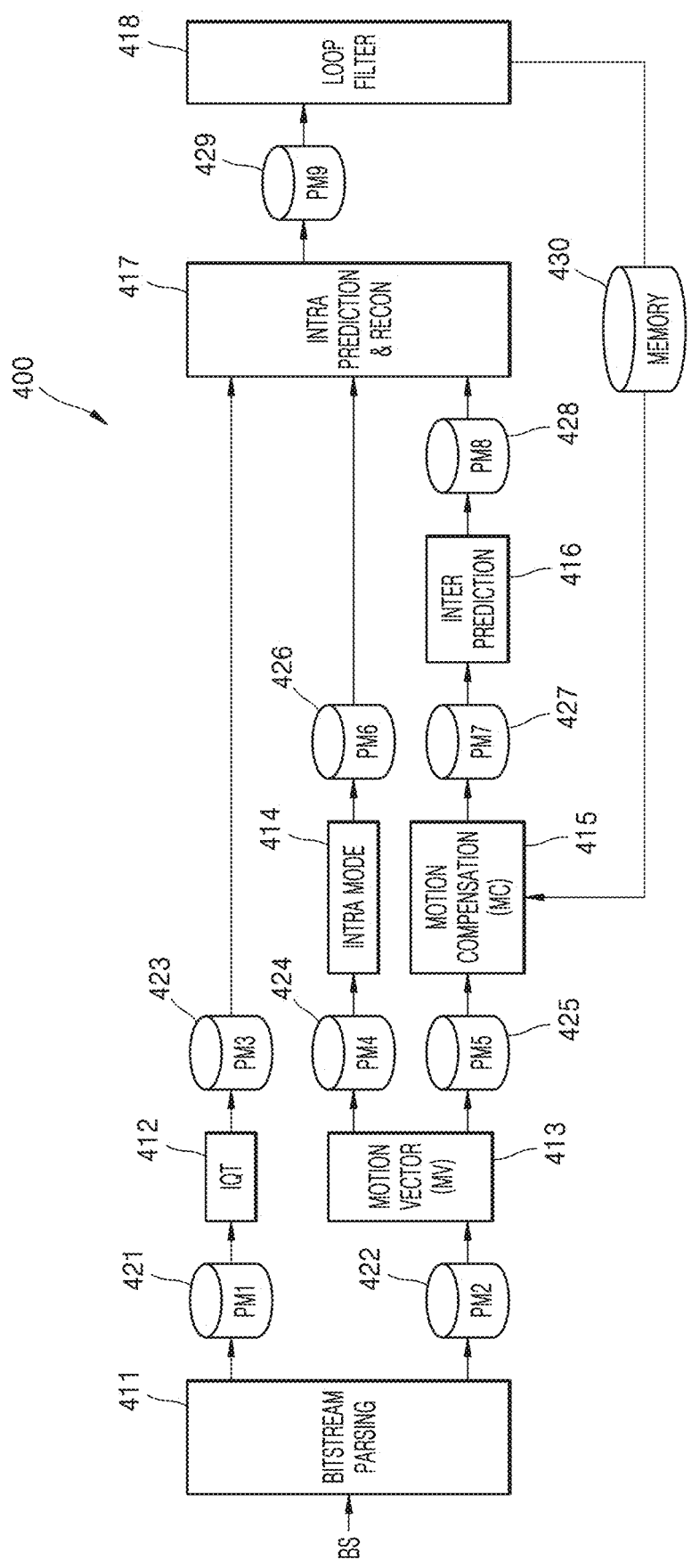
FIG. 4 is a block diagram of a video decoding device according to some embodiments.

FIG. 4 is a block diagram of a video decoding device 400 according to some embodiments.

Referring to FIG. 4, the video decoding device 400 may correspond to the video decoding device 200 illustrated in FIG. 1. The video decoding device 400 may include a bitstream parsing block 411, an inverse quantization transformation (IQT) block 412, a motion vector block 413, an intra mode block 414, a motion compensation block 415, an inter prediction block 416, an intra prediction and recon block 417, a loop filter block 418, first to ninth pipeline memories 421 to 429, and a memory 430.

The bitstream parsing block 411, the IQT block 412, the motion vector block 413, the intra mode block 414, the motion compensation block 415, the inter prediction block 416, the intra prediction and recon block 417, and the loop filter block 418 may be included in the plurality of hardware blocks 211, 213, 215, and 217 described above with reference to FIG. 2. That is, in the example illustrated in FIG. 4, the number of hardware blocks n may be set to 8.

The bitstream parsing block 411 may parse a bitstream BS. The bitstream parsing block 411 may parse the bitstream BS for each syntax. Parsing may include context adaptive variable length decoding (CAVLD) and context adaptive binary arithmetic decoding (CABAD). The bitstream parsing block 411 may be referred to as an entropy decoding block.

The bitstream parsing block 411 may perform entropy decoding on the bitstream BS to obtain various pieces of information included in the bitstream BS. The various pieces of information included in the bitstream BS may include, for example, quantized coefficients, a decoded coding parameter, an inter prediction parameter, an intra prediction parameter, a transformation parameter, a quantized parameter, a loop filter parameter, and/or other syntax. The inter prediction parameter may include, for example, a reference image index and a motion vector. The intra prediction parameter may include, for example, an intra prediction mode or index.

In some embodiments, the bitstream parsing block 411 may parse the bitstream BS by pipeline units and may store a parsed result in each of the first pipeline memory 421 and the second pipeline memory 422. Unit data obtained through processing by the bitstream parsing block 411 may be stored in the first pipeline memory 421 and the second pipeline memory 422. The first pipeline memory 421 may be disposed between the bitstream parsing block 411 and the IQT block 412. The second pipeline memory 422 may be disposed between the bitstream parsing block 411 and the motion vector block 413.

The IQT block 412 may inversely quantize the parsed bitstream BS and may perform inverse transformation on an inversely quantized result. In some embodiments, the IQT block 412 may inversely quantize the parsed bitstream BS by pipeline units and may perform inverse transformation on the inversely quantized result by pipeline units. In some embodiments, the IQT block 412 may read unit data stored in the first pipeline memory 421. The IQT block 412 may be referred to as an inverse quantization and inverse transformation block. In some embodiments, the IQT block 412 may store a result of inverse quantization and inverse transformation in the third pipeline memory 423. Unit data obtained through processing by the IQT block 412 may be stored in the third pipeline memory 423. The third pipeline memory 423 may be disposed between the IQT block 412 and the intra prediction and recon block 417.

The motion vector block 413 may obtain a motion vector based on unit data obtained from the second pipeline memory 422. In some embodiments, the motion vector block 413 may process unit data divided by pipeline units to obtain the motion vector. In some embodiments, the motion vector block 413 may store unit data of the motion vector in each of the fourth pipeline memory 424 and the fifth pipeline memory 425. The fourth pipeline memory 424 may be disposed between the motion vector block 413 and the intra mode block 414. The fifth pipeline memory 425 may be disposed between the motion vector block 413 and the motion compensation block 415.

The intra mode block 414 may determine prediction information about a video block of a current video slice based on motion vectors. The intra mode block 414 may generate prediction blocks corresponding to the current video block which is being decoded by using the prediction information. For example, the intra mode block 414 may determine a prediction mode (for example, intra prediction or inter prediction) used for coding video blocks of a video slice by using some of syntaxes. The intra mode block 414 may determine an inter prediction slice type (for example, a B slice, a P slice, or a GPB slice) by using some of the syntaxes. The intra mode block 414 may determine configuration information about one or more of reference image lists corresponding to a slice by using some of the syntaxes. The intra mode block 414 may determine motion vectors corresponding to an inter encoded video block of each slice by using some of the syntaxes. The intra mode block 414 may determine an inter prediction state of an inter coded video block of each slice by using some of the syntaxes. The intra mode block 414 may determine other information for decoding video blocks in a current video slice by using some of the syntaxes.

In some embodiments, the intra mode block 414 may process unit data divided by pipeline units and may store the unit data in the sixth pipeline memory 426. The sixth pipeline memory 426 may be disposed between the intra mode block 414 and the intra prediction and recon block 417.

The motion compensation block 415 may perform motion compensation on one or more reference images by using a motion vector corresponding to unit data stored in the fifth pipeline memory 425, thereby generating a prediction image. Because a size of reference image data of a reference image is relatively large, the reference image data may be stored in the memory 430. A motion vector may represent position information about a most similar region when motion prediction is performed from a reference image (or a reference frame), in a current coding unit. In some embodiments, the motion compensation block 415 may store unit data, corresponding to a prediction image, in the seventh pipeline memory 427. The seventh pipeline memory 427 may be disposed between the motion compensation block 415 and the inter prediction block 416.

The inter prediction block 416 may perform inter prediction based on unit data stored in the seventh pipeline memory 427. As a result of performing inter prediction, a prediction block corresponding to a coding unit may be generated. The inter prediction may be referred to as an operation of predicting a coding unit from data of a previously coded picture. In some embodiments, the inter prediction block 416 may store unit data, corresponding to a result of the inter prediction, in the eighth pipeline memory 428. The eighth pipeline memory 428 may be disposed between the inter prediction block 416 and the intra prediction and recon block 417.

The intra prediction and recon block 417 may perform intra prediction based on pieces of unit data stored in the third, sixth, and eighth pipeline memories 423, 426, and 428 and may summate pieces of unit data or sample values stored in the third, sixth, and eighth pipeline memories 423, 426, and 428 to reconfigure samples. The intra prediction may be referred to as an operation of predicting a coding unit from previously coded data of the same picture generally. In some embodiments, the intra prediction and recon block 417 may store unit data, corresponding to a reconfiguration result, in the ninth pipeline memory 429. The ninth pipeline memory 429 may be disposed between the intra prediction and recon block 417 and the loop filter block 418.

The loop filter block 418 may include a deblocking filter (not shown) which decreases a blocking phenomenon occurring in restoring the bitstream BS. When a flag of the loop filter block 418 is activated, the loop filter block 418 may store image data, obtained through decoding after filtering, in the memory 430. For example, when the flag of the loop filter block 418 is not activated, the loop filter block 418 may store image data, restored immediately after the inter prediction or the intra mode prediction, in the memory 430. The loop filter block 418 may be referred to as an in-loop filter.

The memory 430 may store decoded image data and reference image data. The memory 430 may also be referred to as a decoded picture buffer (DPB).

The first to ninth pipeline memories 421 to 429 may be included in the plurality of pipeline memories 212 and 214 described above with reference to FIG. 2.

In some embodiments, the first to ninth pipeline memories 421 to 429 may store current coding unit (CU) size information, next CU position information, and scan type information. The current CU size information may include data representing a size of a current CU including unit pixel groups corresponding to a pipeline area unit among a plurality of unit pixel groups included in a CTU. A unit pixel group is described below with reference to FIGS. 7A to 7E. The next CU position information may include data representing a position of a CU next to a current CU including each of unit pixel groups corresponding to a pipeline area unit. The scan type information may include data representing a scan type of a unit pixel group. For example, the scan type may be a z-scan. As another example, the scan type may be a raster-scan. However, embodiments are not limited thereto. In some embodiments, the first pipeline memory 421 and the second pipeline memory 422 may further store data representing decoded information. The third pipeline memory 423 may further store data representing residual. The fourth to sixth pipeline memories 424 to 426 may further store data representing an intra mode and a motion vector. The seventh to ninth pipeline memories 427 to 429 may further store data representing a pixel value. Furthermore, the seventh pipeline memory 427 may further store data representing a reference pixel value (or a reference image or a reference frame).

FIG. 5 is a diagram for describing a decoding processing operation by pipeline units, according to some embodiments.

Referring to FIGS. 4 and 5, in a first pipeline stage PSTG 1, the bitstream parsing block 411 may process first unit data UD 1 and may store the processed first unit data UD 1 in the first pipeline memory 421 and the second pipeline memory 422. Furthermore, the IQT block 412, the motion vector block 413, the intra mode block 414, the motion compensation block 415, the inter prediction block 416, the intra prediction and recon block 417, and the loop filter block 418 may wait for unit data.

In a second pipeline stage PSTG 2, the bitstream parsing block 411 may process second unit data UD 2 and may store the processed second unit data UD 2 in the first pipeline memory 421 and the second pipeline memory 422. The IQT block 412 and the motion vector block 413 may read the first unit data UD 1 stored respectively in the first pipeline memory 421 and the second pipeline memory 422, process the first unit data UD 1, and store the first unit data UD 1 in the third to fifth pipeline memories 423 to 425. The intra mode block 414, the motion compensation block 415, the inter prediction block 416, the intra prediction and recon block 417, and the loop filter block 418 may wait for unit data.

In a third pipeline stage PSTG 3, the bitstream parsing block 411 may process third unit data UD 3 and may store the processed third unit data UD 3 in the first pipeline memory 421 and the second pipeline memory 422. The IQT block 412 and the motion vector block 413 may read the second unit data UD 2 stored respectively in the first pipeline memory 421 and the second pipeline memory 422, process the second unit data UD 2, and store the second unit data UD 2 in the third to fifth pipeline memories 423 to 425. The intra mode block 414 and the motion compensation block 415 may read the first unit data UD 1 stored in the fourth to fifth pipeline memories 424 to 425, process the first unit data UD 1, and store the first unit data UD 1 in the sixth and seventh pipeline memories 426 and 427. The inter prediction block 416, the intra prediction and recon block 417, and the loop filter block 418 may wait for unit data.

In a fourth pipeline stage PSTG 4, the bitstream parsing block 411 may process fourth unit data UD 4 and may store the processed fourth unit data UD 4 in the first pipeline memory 421 and the second pipeline memory 422. The IQT block 412 and the motion vector block 413 may read the third unit data UD 3 stored respectively in the first pipeline memory 421 and the second pipeline memory 422, process the third unit data UD 3, and store the third unit data UD 3 in the third to fifth pipeline memories 423 to 425. The intra mode block 414 and the motion compensation block 415 may read the second unit data UD 2 stored in the fourth to fifth pipeline memories 424 to 425, process the second unit data UD 2, and store the second unit data UD 2 in the sixth and seventh pipeline memories 426 and 427. The inter prediction block 416 and the intra prediction and recon block 417 may process the first unit data UD 1. The loop filter block 418 may wait for unit data.

In a fifth pipeline stage PSTG 5, the bitstream parsing block 411 may process fifth unit data UD 5. The IQT block 412 and the motion vector block 413 may process the fourth unit data UD 4. The intra mode block 414 and the motion compensation block 415 may read the third unit data UD 3. The inter prediction block 416 and the intra prediction and recon block 417 may process the second unit data UD 2. The loop filter block 418 may process the first unit data UD 1.

In a similar manner, in a sixth pipeline stage PSTG 6, a seventh pipeline stage PSTG 7, and pipeline stages successively following the seventh pipeline stage PSTG 7, hardware blocks (for example, 411 to 418) may operate.

Figure 6:
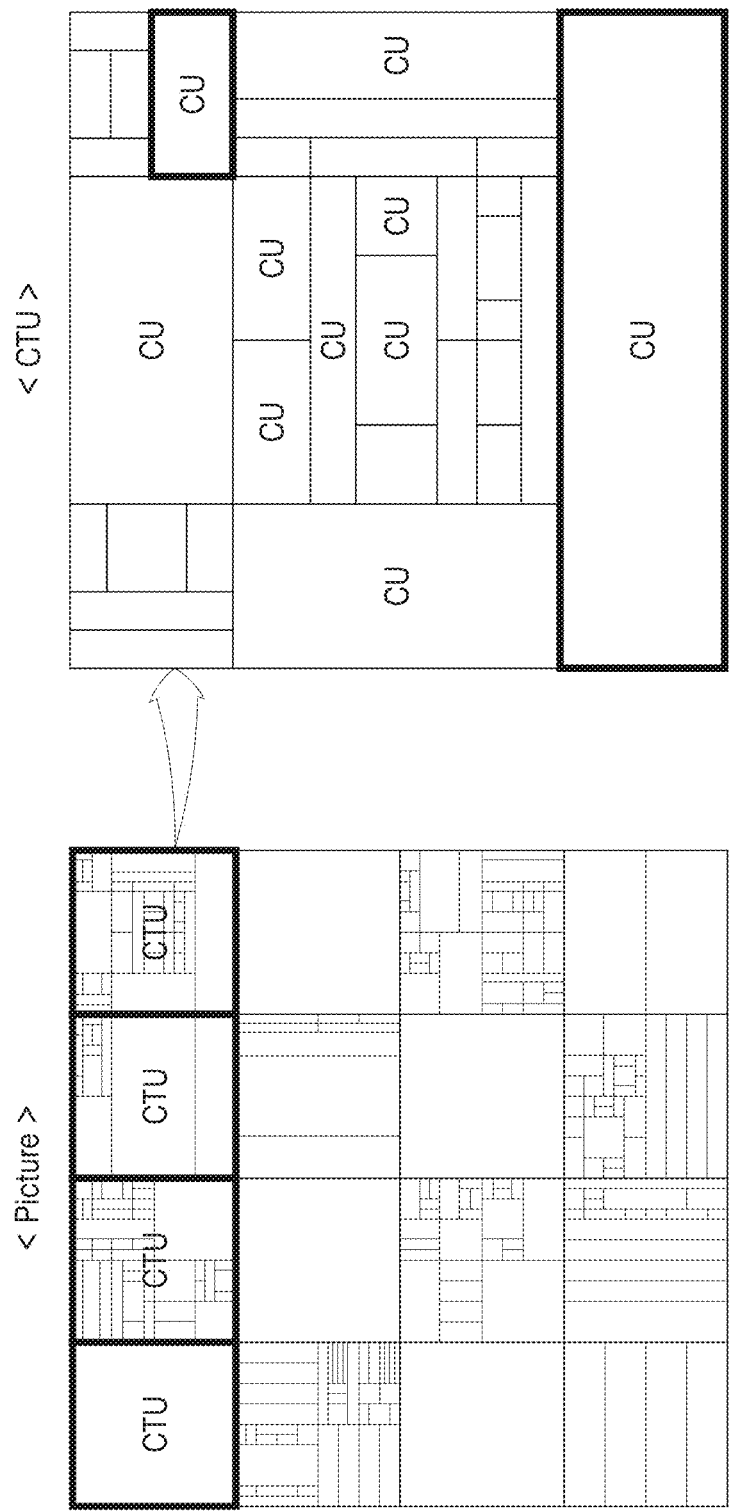
FIG. 6 is a diagram for describing a coding tree unit and a coding unit according to some embodiments.

FIG. 6 is a diagram for describing a CTU and a CU, according to some embodiments.

Referring to FIG. 6, a picture (PICTURE) may be divided into a plurality of CTUs. In the picture (PICTURE), a size of a region corresponding to each CTU may be constant. However, embodiments are not limited thereto. For example, one CTU may include 64*64 pixels. As another example, one CTU may include 128*128 pixels. However, embodiments are not limited thereto.

One CTU may include a plurality of CUs. In the picture (PICTURE), the region corresponding to each CTU may have various sizes and shapes. Accordingly, the number of pixels included in each CU may be constant or differ for each CU.

FIGS. 7A to 7E are diagrams for describing a tree division mode according to some embodiments.

Referring to FIGS. 7A to 7E, based on the tree division mode, at least one CU may be included in one CTU. Different CUs may be differentiated from one another, as shown using thick lines illustrated in FIGS. 7A to 7E. Different CUs may include a same or different number of unit pixel groups UPXG. In FIGS. 7A to 7E, it may be assumed that one CTU includes 64*64 pixels and one unit pixel group UPXG includes 4*4 pixels.

Figure 7A:
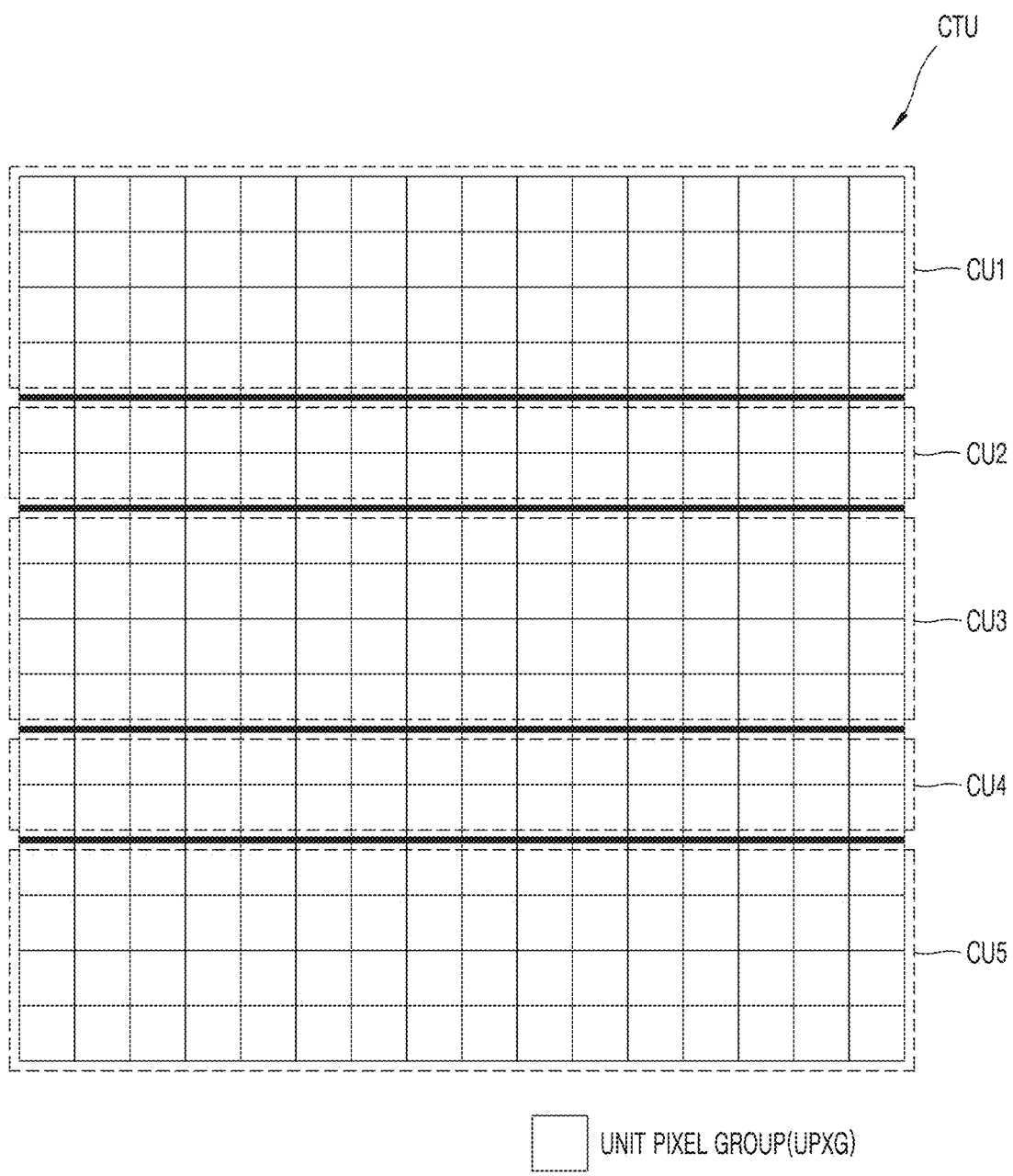
FIGS. 7A to 7E are diagrams for describing a tree division mode according to some embodiments.

According to a tree division mode illustrated in FIG. 7A, one CTU may include first to fifth CUs CU 1 to CU 5. The number of unit pixel groups UPXG included in the first CU CU 1 may be the same as the number of unit pixel groups UPXG included in the third CU CU 3 and the same as the number of unit pixel groups UPXG included in the fifth CU CU 5. For example, the number of unit pixel groups UPXG included in each of the first CU CU 1, the third CU CU 3, and the fifth CU CU 5 may be 16*4 and the number of pixels included in each unit pixel group UPXG may be 4*4, and thus, the number of pixels included in each of the first CU CU 1, the third CU CU 3, and the fifth CU CU 5 may be 64*16. The number of unit pixel groups UPXG included in the second CU CU 2 may be the same as the number of unit pixel groups UPXG included in the fourth CU CU 4. For example, the number of unit pixel groups UPXG included in each of the first CU CU 1 and the fourth CU CU 4 may be 16*2, and the number of pixels included in each of the second CU CU 2 and the fourth CU CU 4 may be 64*8.

Figure 7B:
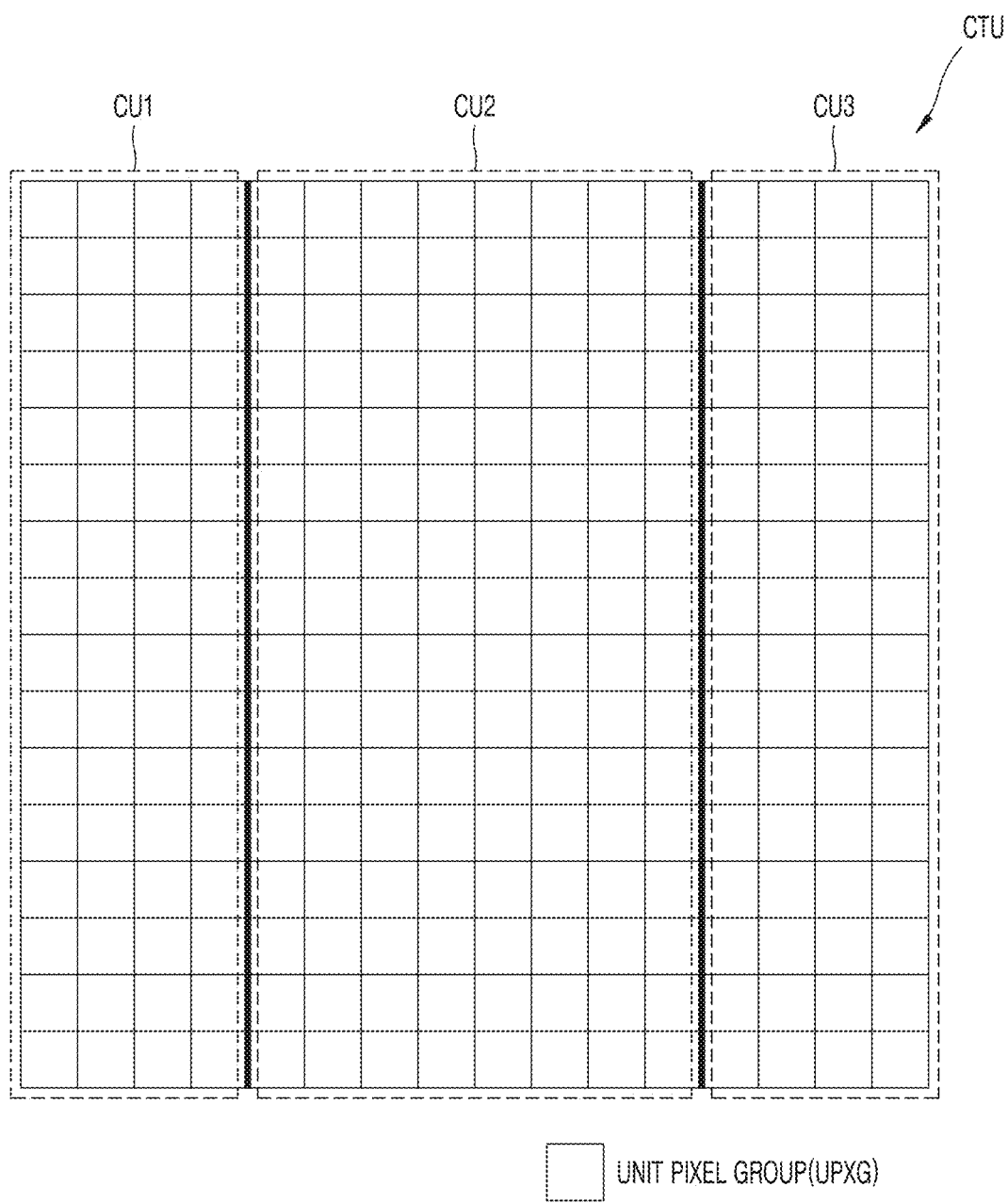

According to a tree division mode illustrated in FIG. 7B, one CTU may include first to third CUs CU 1 to CU 3. The number of unit pixel groups UPXG included in the first CU CU 1 may be the same as the number of unit pixel groups UPXG included in the third CU CU 3. For example, the number of unit pixel groups UPXG included in each of the first CU CU 1 and the third CU CU 3 may be 4*16, and the number of pixels included in each of the first CU CU 1 and the third CU CU 3 may be 16*64. The number of unit pixel groups UPXG included in the second CU CU 2 may be 8*16, and the number of pixels included in the second CU CU 2 may be 32*64.

Figure 7C:
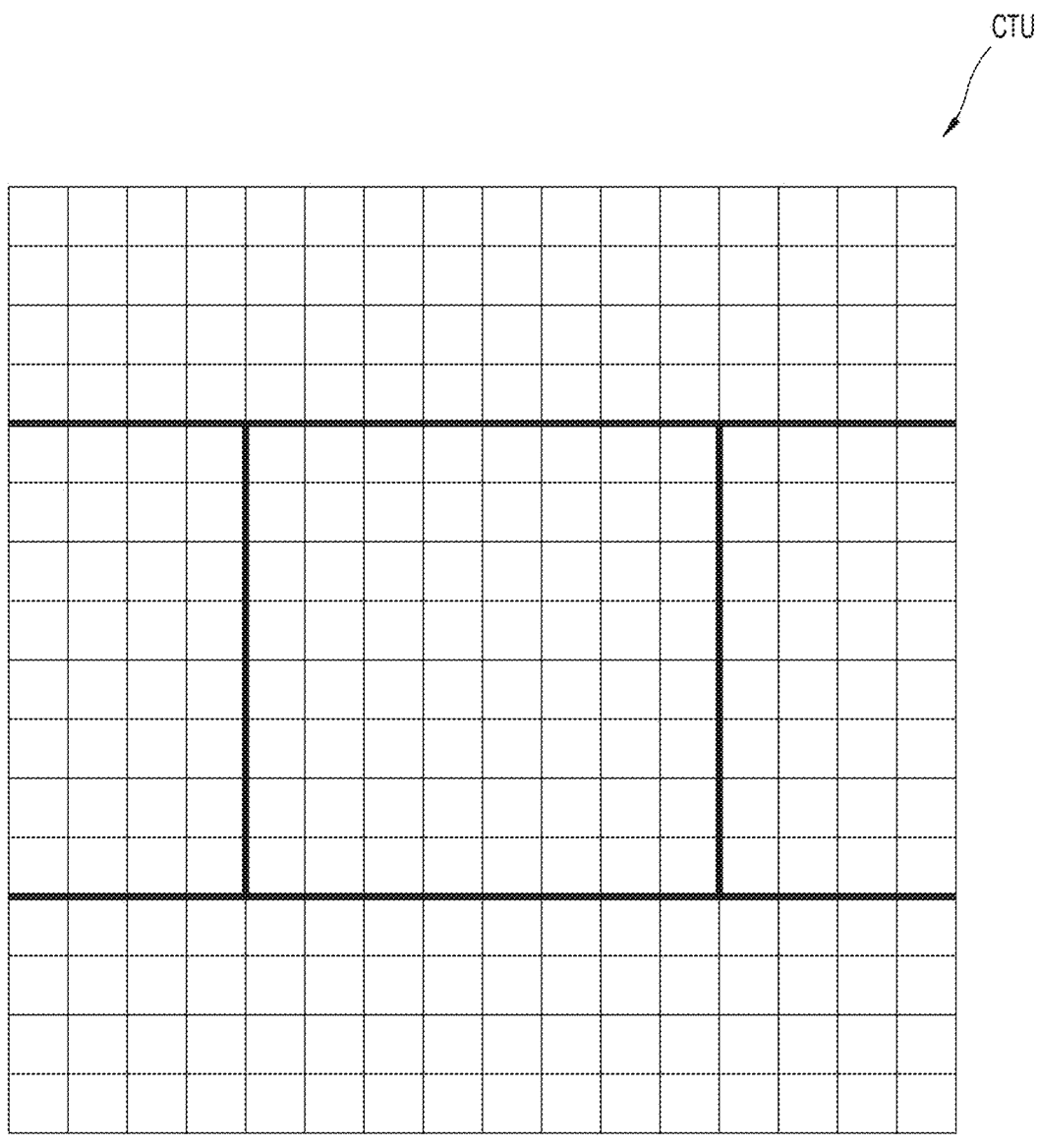
Figure 7C:
Figure 7D:
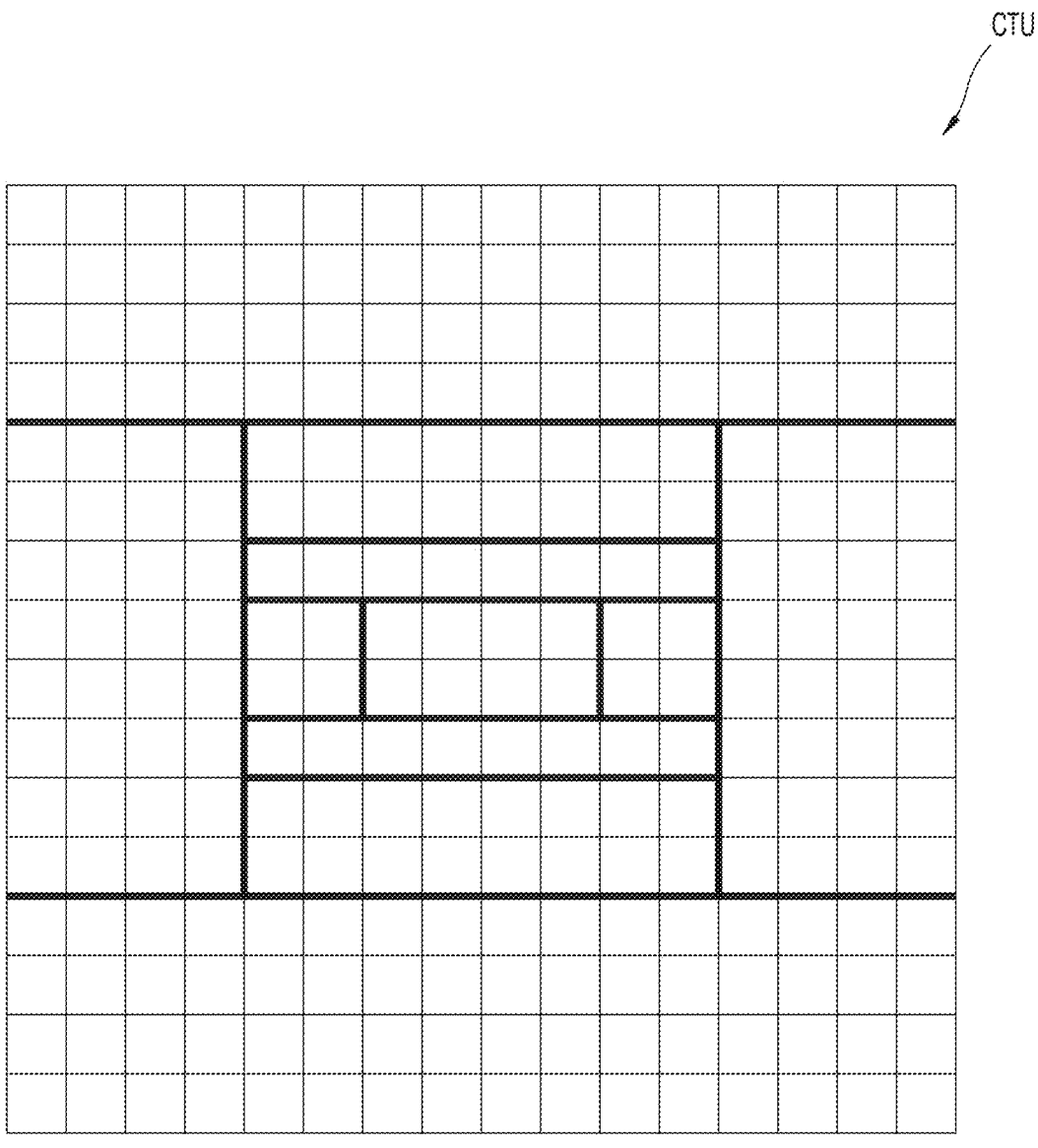
Figure 7E:
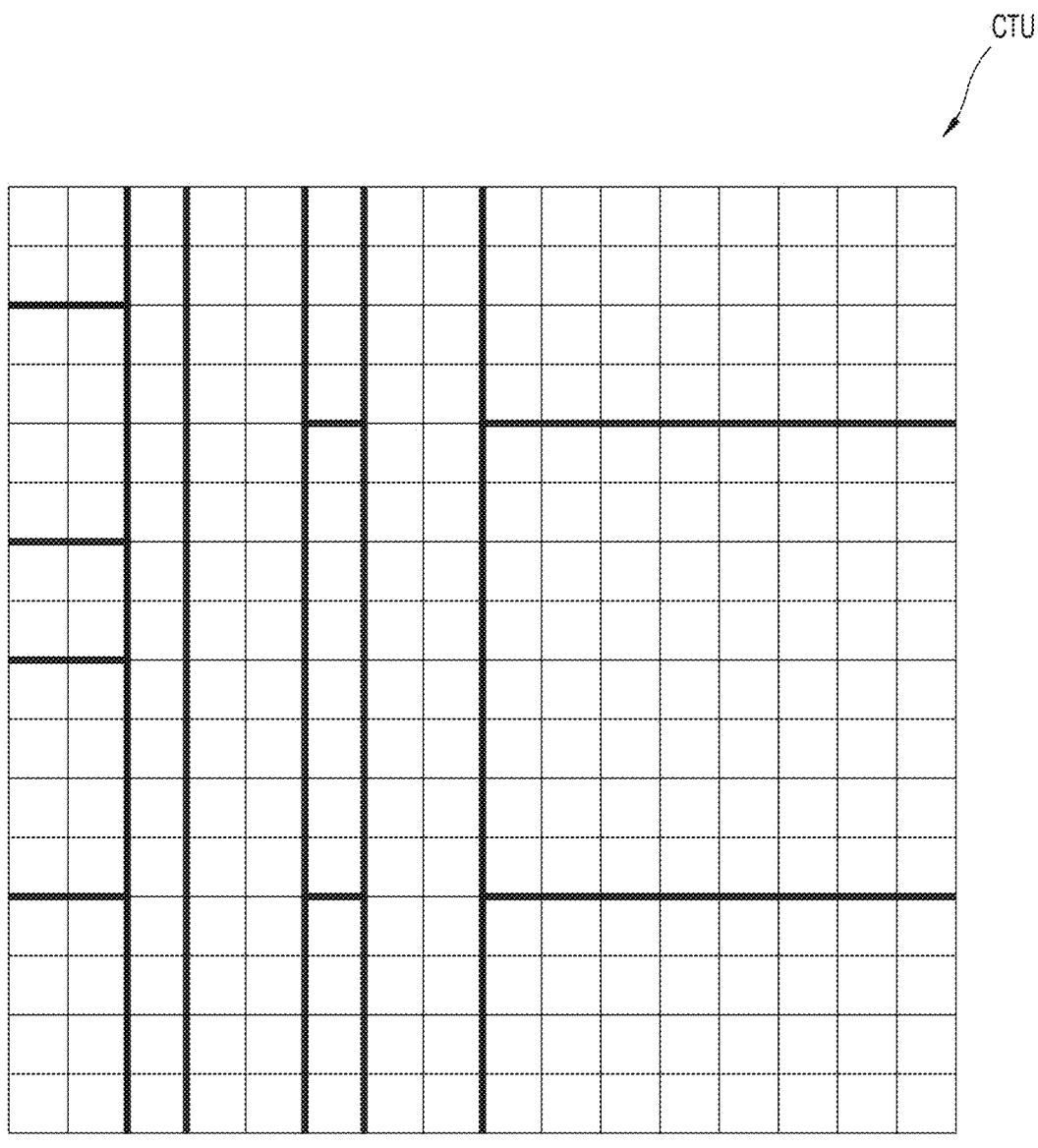
Figure 7E:

According to a tree division mode illustrated in FIG. 7C, one CTU may include five CUs. According to a tree division mode illustrated in FIG. 7D, one CTU may include eleven CUs. According to a tree division mode illustrated in FIG. 7E, one CTU may include fourteen CUs. The tree division modes illustrated in FIGS. 7A-7E are only examples and, in some embodiments, different numbers and arrangements of the CUs than those illustrated in FIGS. 7A-7E may be provided.

FIGS. 8A to 8E are diagrams for describing examples of a pipeline area unit in the tree division modes illustrated in FIGS. 7A to 7E, respectively.

Referring to FIGS. 8A to 8E, a plurality of pipeline area units may be included in one CTU, regardless of a tree division mode. The pipeline area unit may be a region which corresponds to a pipeline unit having a predetermined size or includes unit pixel groups UPXG. The number of unit pixel groups included in one pipeline area unit may be, for example, 64, and the number of pixels included in one pipeline area unit may be 1,024 (or **32*32). However, embodiments are not limited thereto. A pipeline area unit may correspond to a memory size of each of a plurality of pipeline memories 212 and 214 and first to ninth pipeline memories 421 to 429**. Also, each unit data may be data where decoding processing is to be performed on one pipeline area unit.

The number of pipeline area units may be, for example, 4, but embodiments are not limited thereto. Hereinafter, for convenience of description, it may be assumed that the number of pipeline area units is 4. First to fourth pipeline area units PAU 1 to PAU 4, as illustrated in FIGS. 8A to 8E, may be differentiated from one another in one CTU.

Figure 9:
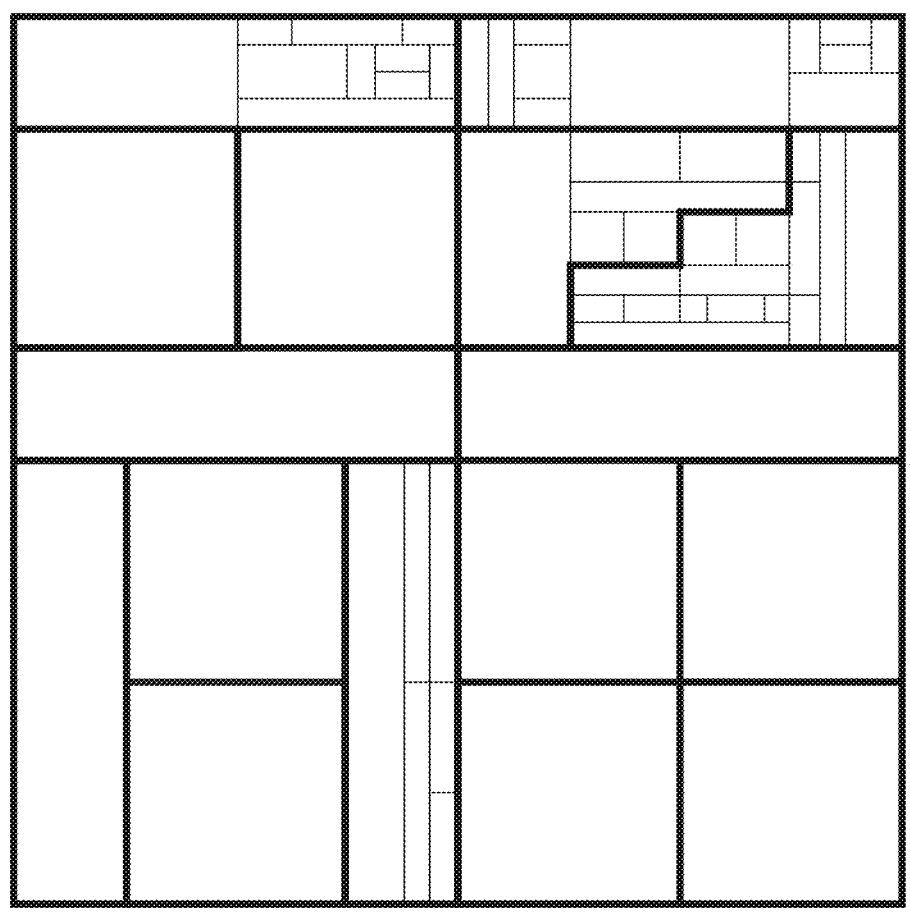
FIG. 9 is a diagram for describing a coding unit and a pipeline area unit in a versatile video coding (VVC) codec, according to some embodiments.
Figure 9:
Figure 9:

FIG. 9 is a diagram for describing a coding unit and a pipeline area unit in a versatile video coding (VVC) codec, according to some embodiments.

Referring to FIG. 9, VVC which is a type of video codec may be a video compression standard which has been developed recently. According to a tree division mode of VVC, as illustrated in FIG. 9, a unit of a CU may be more subdivided. Based on a tree division mode of VVC, in "SPLIT_TT_VER" and "SPLIT_TT_HOR", one CTU may be divided into an odd number of CUs.

FIGS. 10A to 10D are diagrams for describing an operation of processing unit data by pipeline units, according to some embodiments.

Figure 8A:
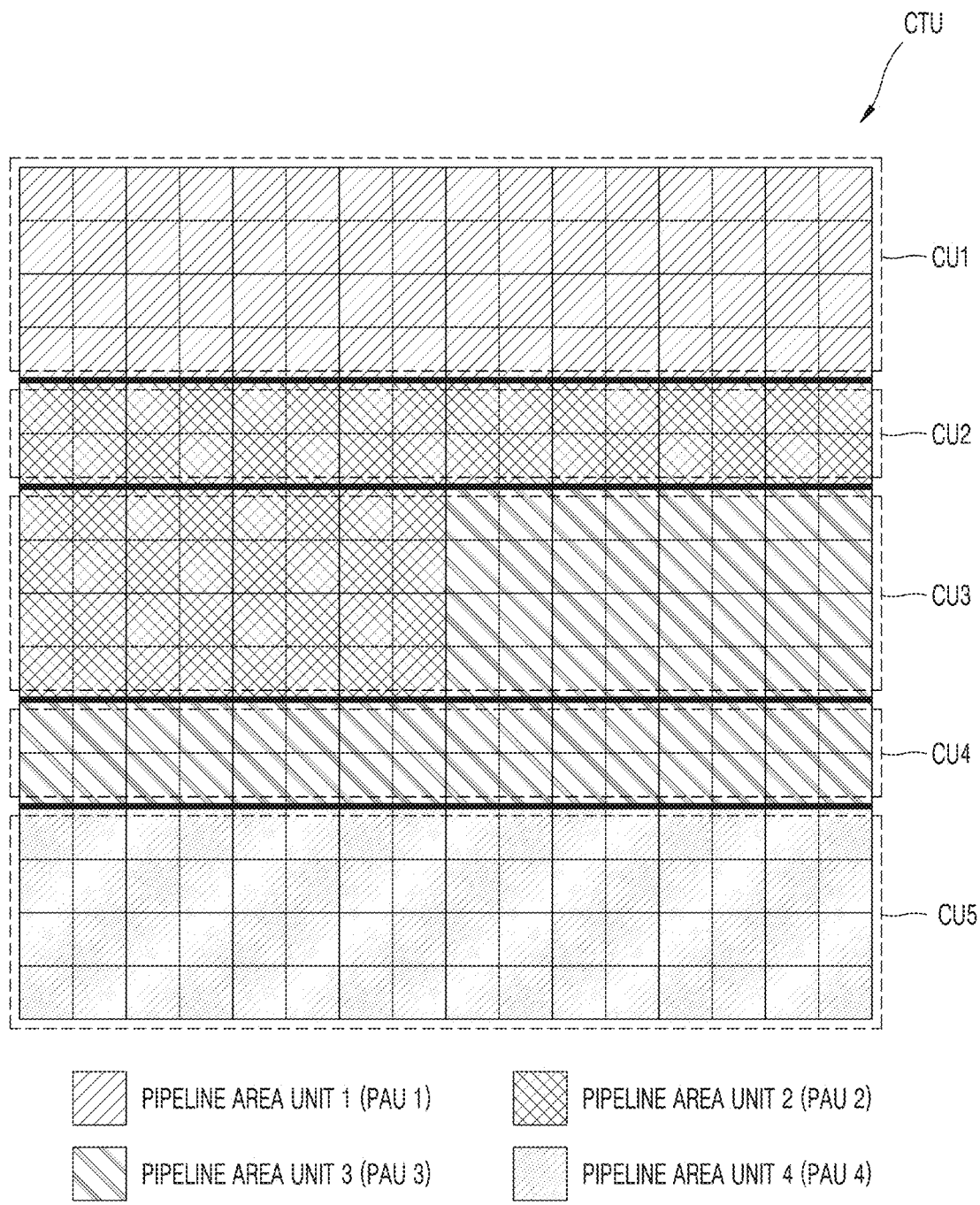
FIGS. 8A to 8E are diagrams for describing examples of a pipeline area unit in the tree division mode illustrated in FIGS. 7A to 7E, respectively, according to various embodiments.
Figure 8B:
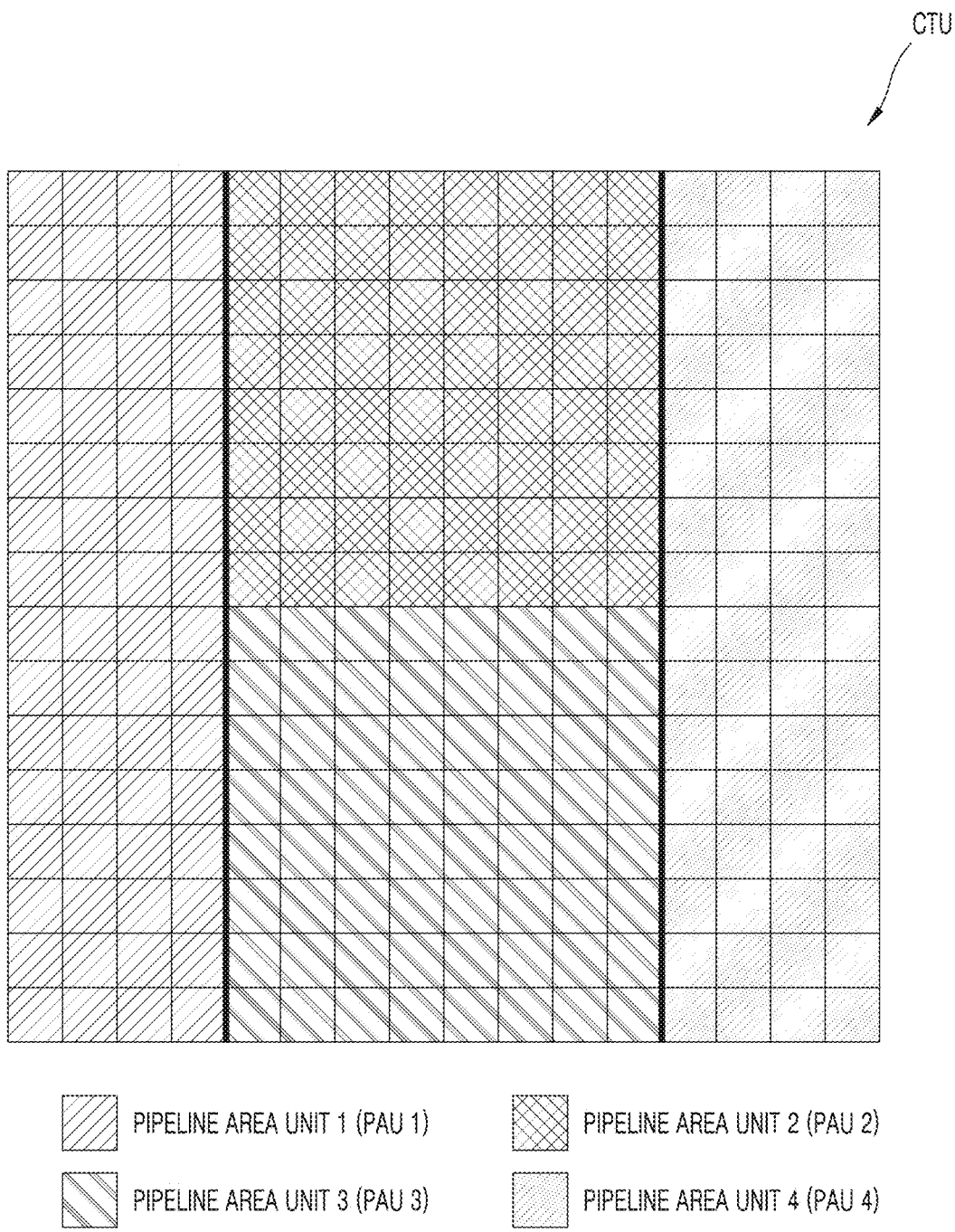
Figure 8C:
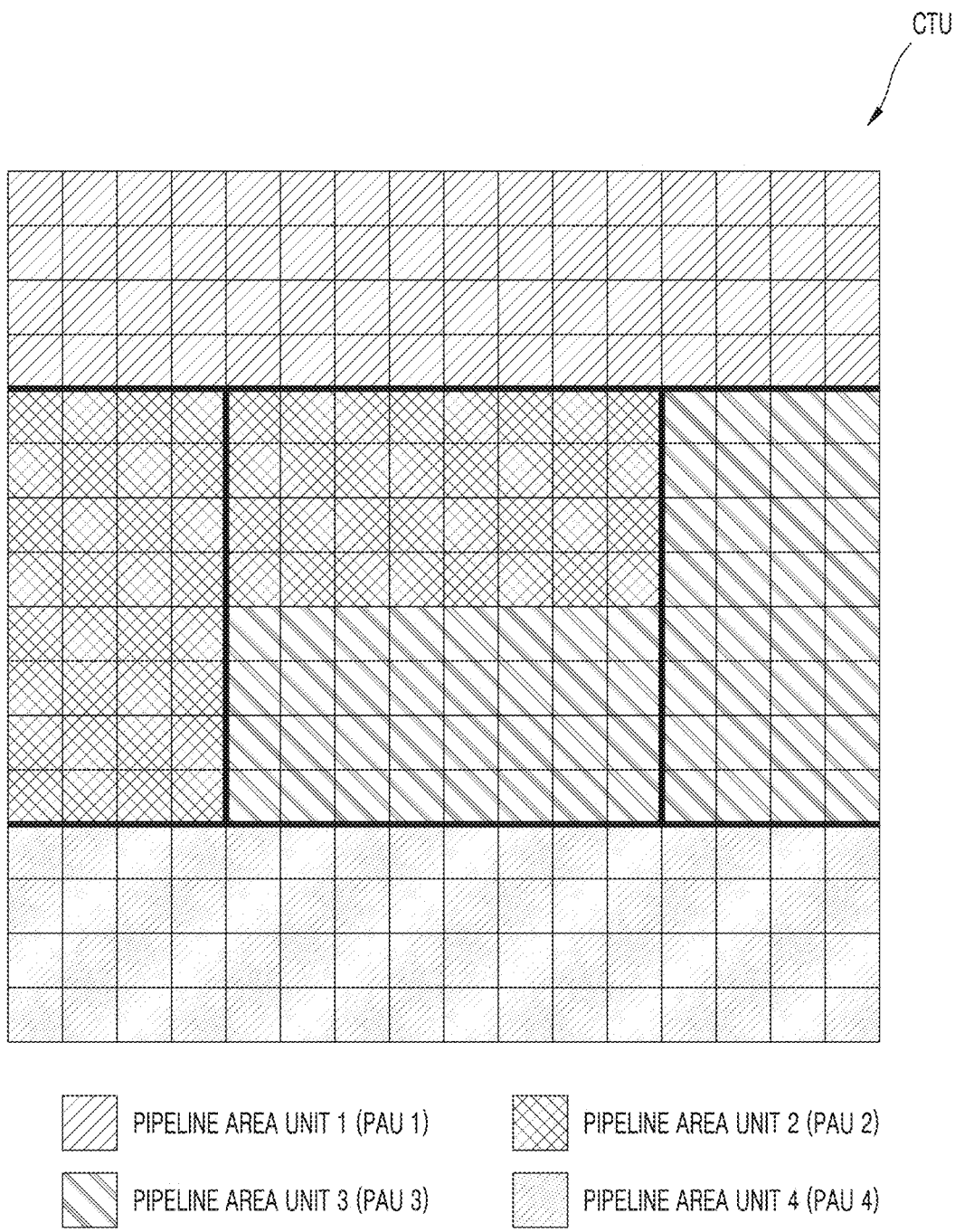
Figure 8D:
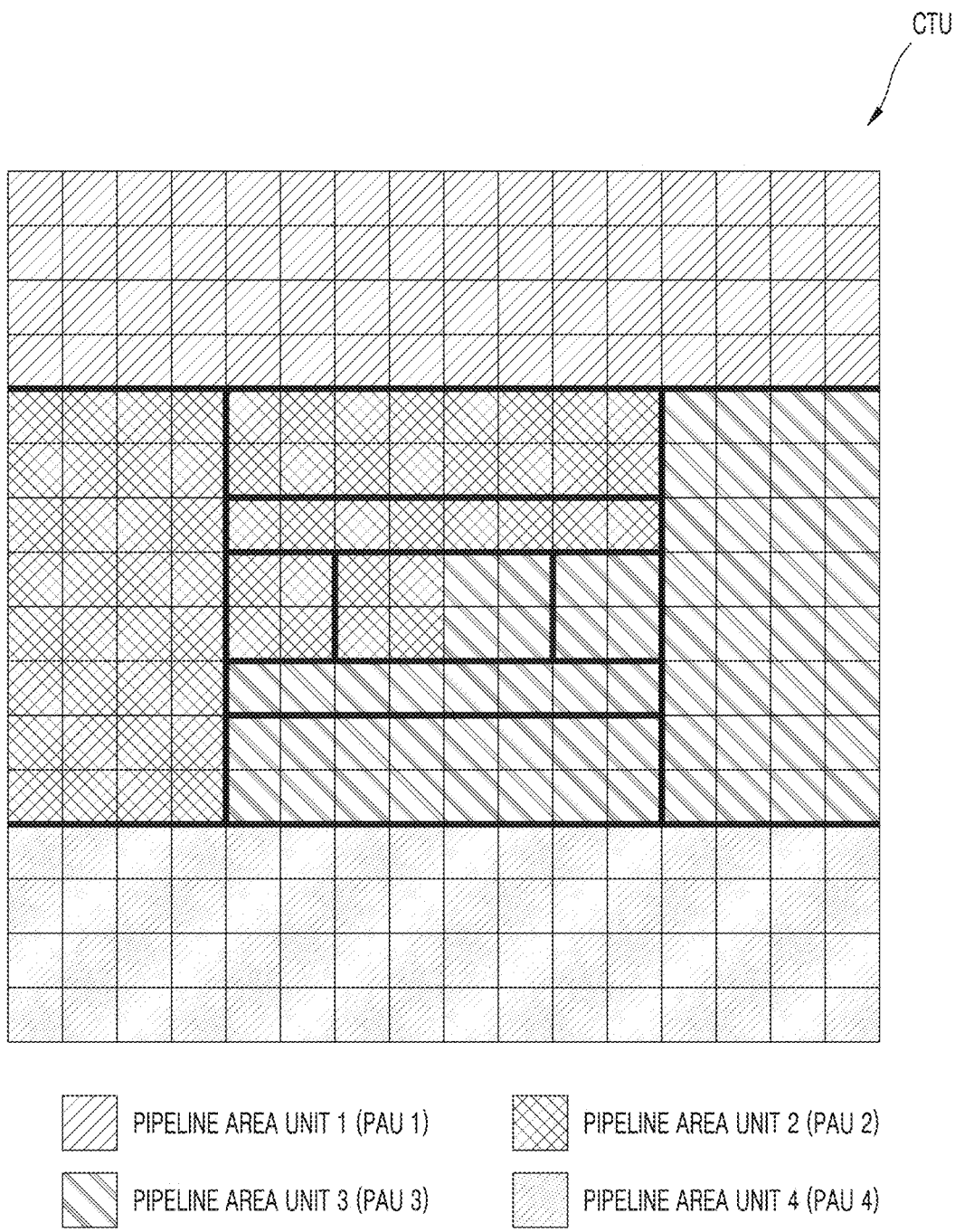
Figure 8E:
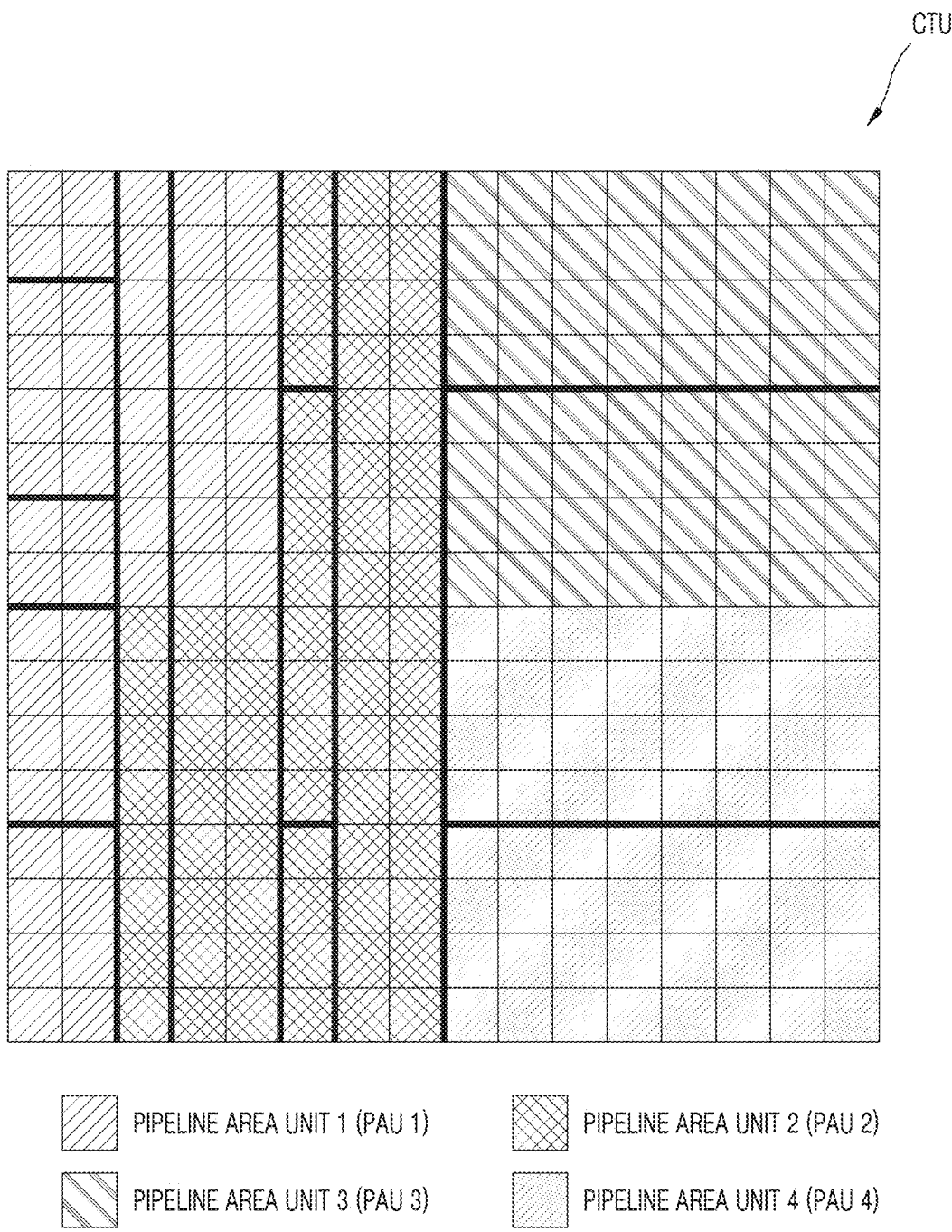

It may be assumed that a tree division mode illustrated in FIGS. 10A to 10D is the tree division mode illustrated in FIGS. 7A and 8A. Also, it may be assumed that pipeline area units illustrated in FIGS. 10A to 10D are the first to fourth pipeline area units PAU 1 to PAU 4 illustrated in FIG. 8A. Also, it may be assumed that a plurality of buffers (BUFFERS) illustrated in FIGS. 10A to 10D are included in the first pipeline memory 212. Also, it may be assumed that each of embodiments illustrated in FIGS. 10A to 10D operates based on the first hardware block 211, the first pipeline memory 212, and the second hardware block 213 in each of the first to fifth pipeline stages PSTG 1 to PSTG 5. It may be assumed that a scan type illustrated in FIGS. 10A to 10D is a z-scan.

Referring to FIGS. 10A to 10D, each pipeline memory may include a plurality of buffers (BUFFERS). For example, with reference to FIG. 2, each of the plurality of pipeline memories 212 and 214 may include a plurality of buffers (BUFFERS). For example with reference to FIG. 4, each of the first to ninth pipeline memories 421 to 429 may include a plurality of buffers (BUFFERS). Each buffer may correspond to one address. One address may correspond to a unit pixel group UPXG. That is, each buffer may store various pieces of information about the unit pixel group UPXG. For example, each of the plurality of buffers (BUFFERS) may store current CU size information (CURRENT CU SIZE), next CU position information (NEXT CU POSITION), scan type information (SCAN TYPE), and other data (OTHER INFO). The current CU size information (CURRENT CU SIZE) may include information about a size of a CU including unit pixel groups UPXG corresponding to a pipeline area unit. The next CU position information (NEXT CU POSITION) may include information about a position of a CU next to the current CU, including unit pixel groups UPXG corresponding to a pipeline area unit. The scan type information (SCAN TYPE) may include information about a scan type of a unit pixel group UPXG. The other data (OTHER INFO) may include information about each of a reference pixel value (or a reference image, a reference frame, or the like), a motion vector, a pixel value, and a prediction mode. The other data (OTHER INFO) may be changed for each of the first to ninth pipeline memories 421 to 429.

Figure 10A:
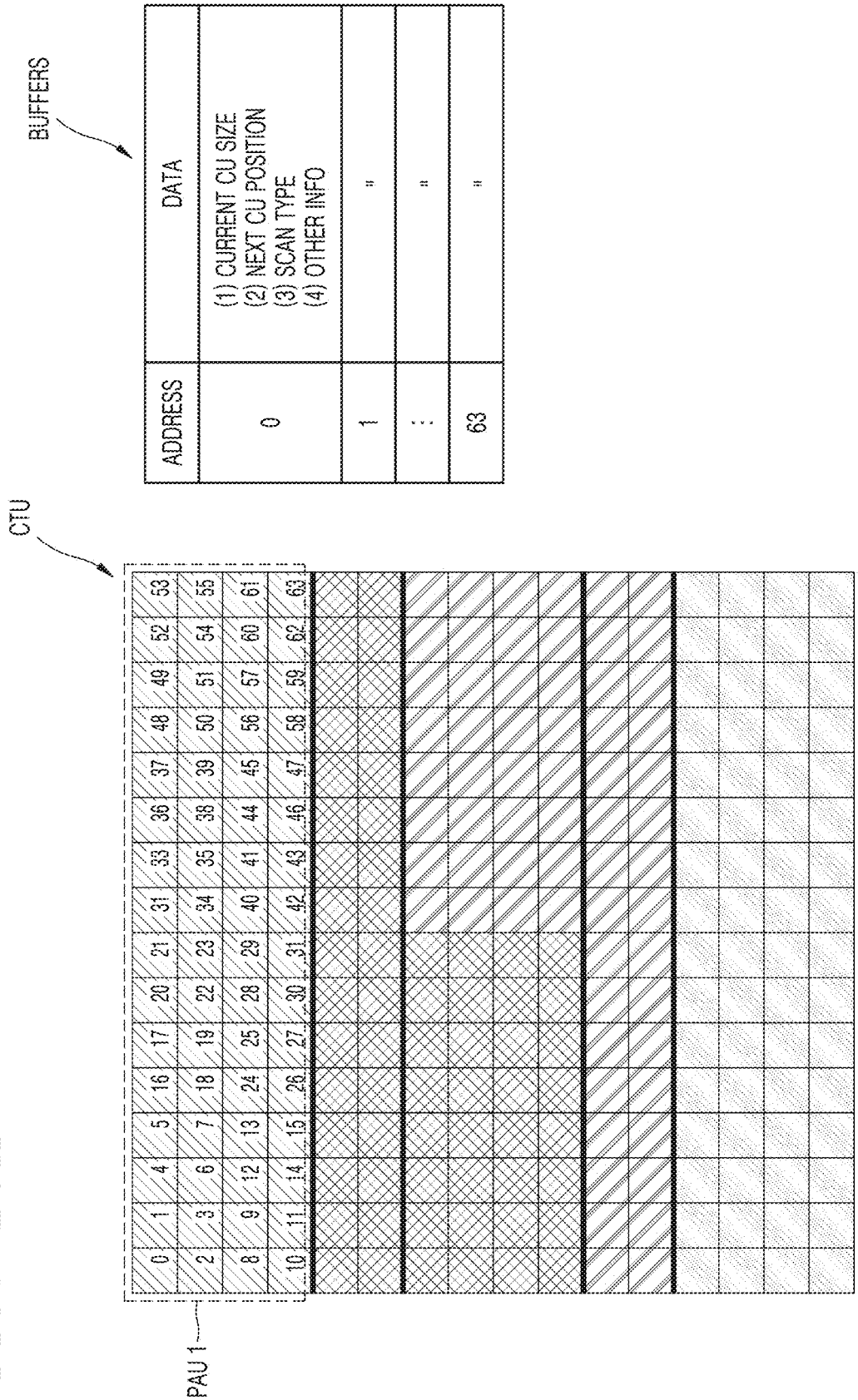
FIGS. 10A to 10D are diagrams for describing an operation of processing unit data by pipeline units, according to some embodiments.

Referring to FIG. 10A, a processing operation on the first pipeline area unit PAU 1 may be performed in the first pipeline stage PSTG 1. Unit data (for example, the first unit data UD 1) of the first pipeline area unit PAU 1 may be processed by the first hardware block 211. Also, the unit data of the first pipeline area unit PAU 1 may be stored in a plurality of buffers (BUFFERS). In detail, data of unit pixel groups UPXG having numbers illustrated in a CTU illustrated in FIG. 10A may be stored in a buffer having a corresponding address. For example, information about a unit pixel group UPXG illustrated by "0" in FIG. 10A may be stored in a buffer having a No. 0 address. First unit data UD 1 may include first current CU size information representing a size of a current CU including unit pixel groups UPXG corresponding to (or included in the first pipeline area unit PAU 1) the first pipeline area unit PAU 1, first next CU position information representing a position of a next CU, and scan type information.

Figure 10B:
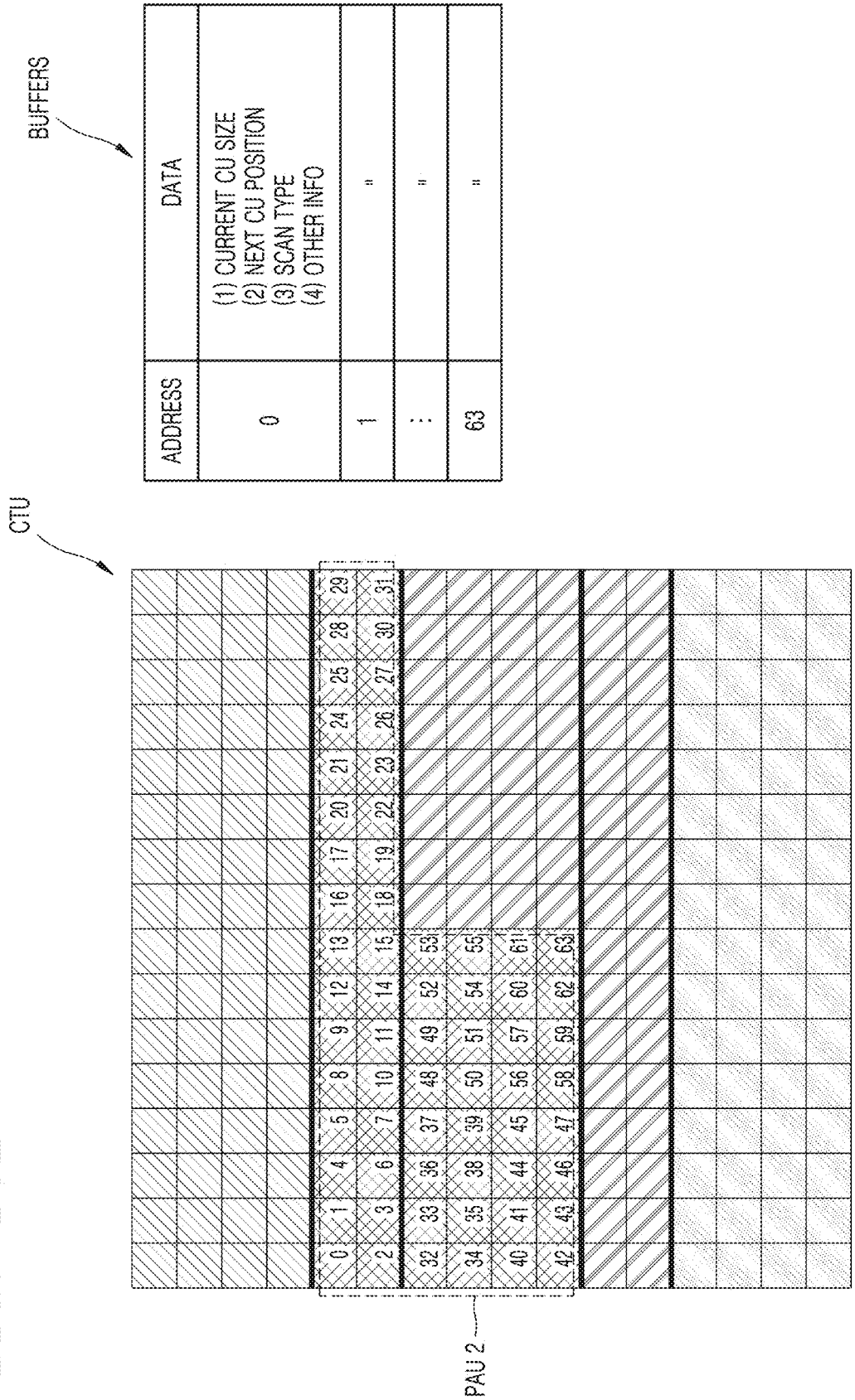

Referring to FIG. 10B, a processing operation on the second pipeline area unit PAU 2 may be performed in the second pipeline stage PSTG 2. Unit data (for example, the second unit data UD 2) of the second pipeline area unit PAU 2 may be processed by the first hardware block 211 and may be stored in a plurality of buffers (BUFFERS). The second unit data UD 2 may include second current CU size information representing a size of a current CU including unit pixel groups UPXG corresponding to (or included in the second pipeline area unit PAU 2) the second pipeline area unit PAU 2, second next CU position information representing a position of a next CU, and scan type information.

Figure 10C:
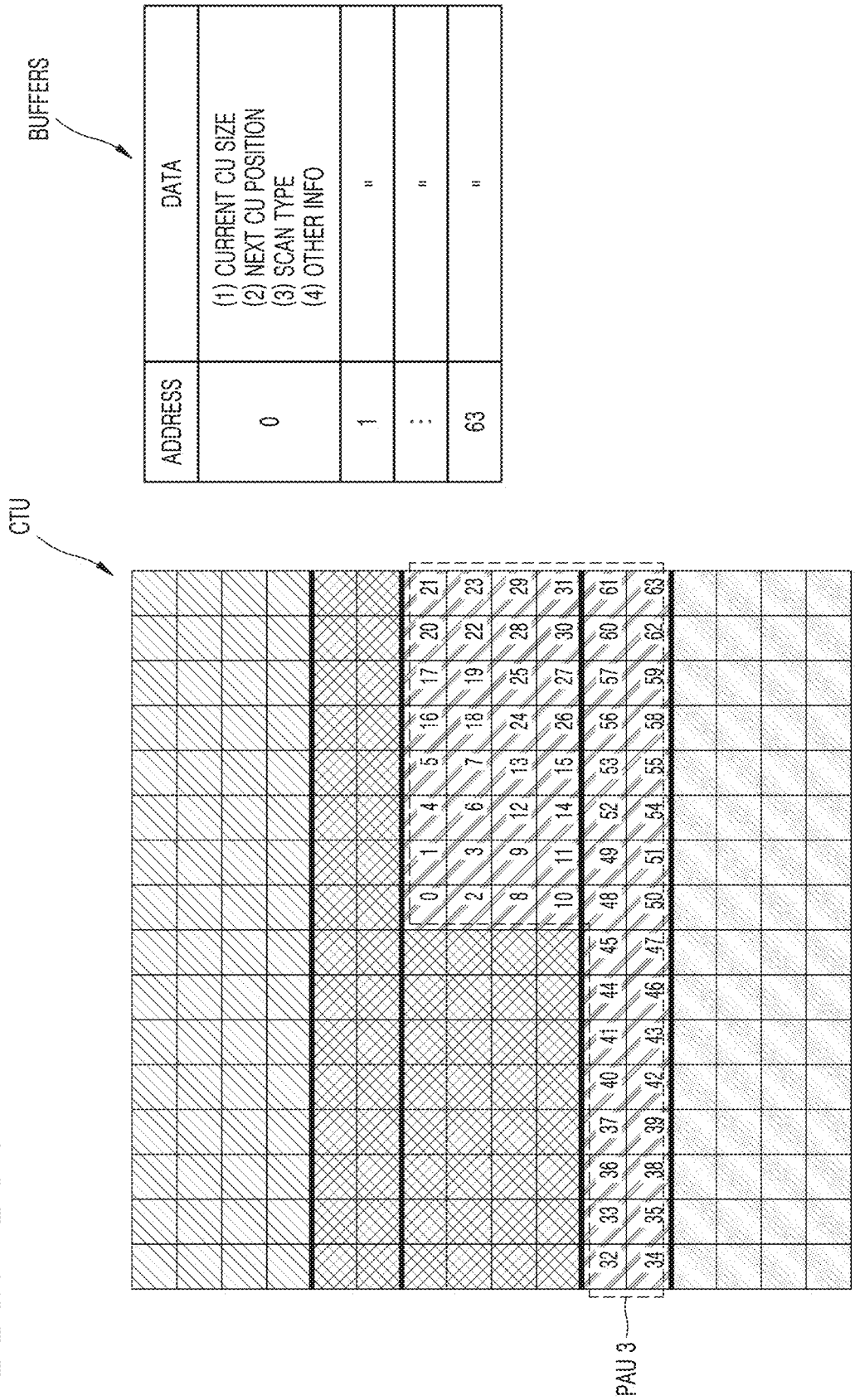

Referring to FIG. 10C, unit data (for example, the third unit data UD 3) of the third pipeline area unit PAU 3 may be processed in the third pipeline stage PSTG 3 and may be stored in a plurality of buffers (BUFFERS). The third unit data UD 3 may include third current CU size information, third next CU position information, and scan type information.

Figure 10D:
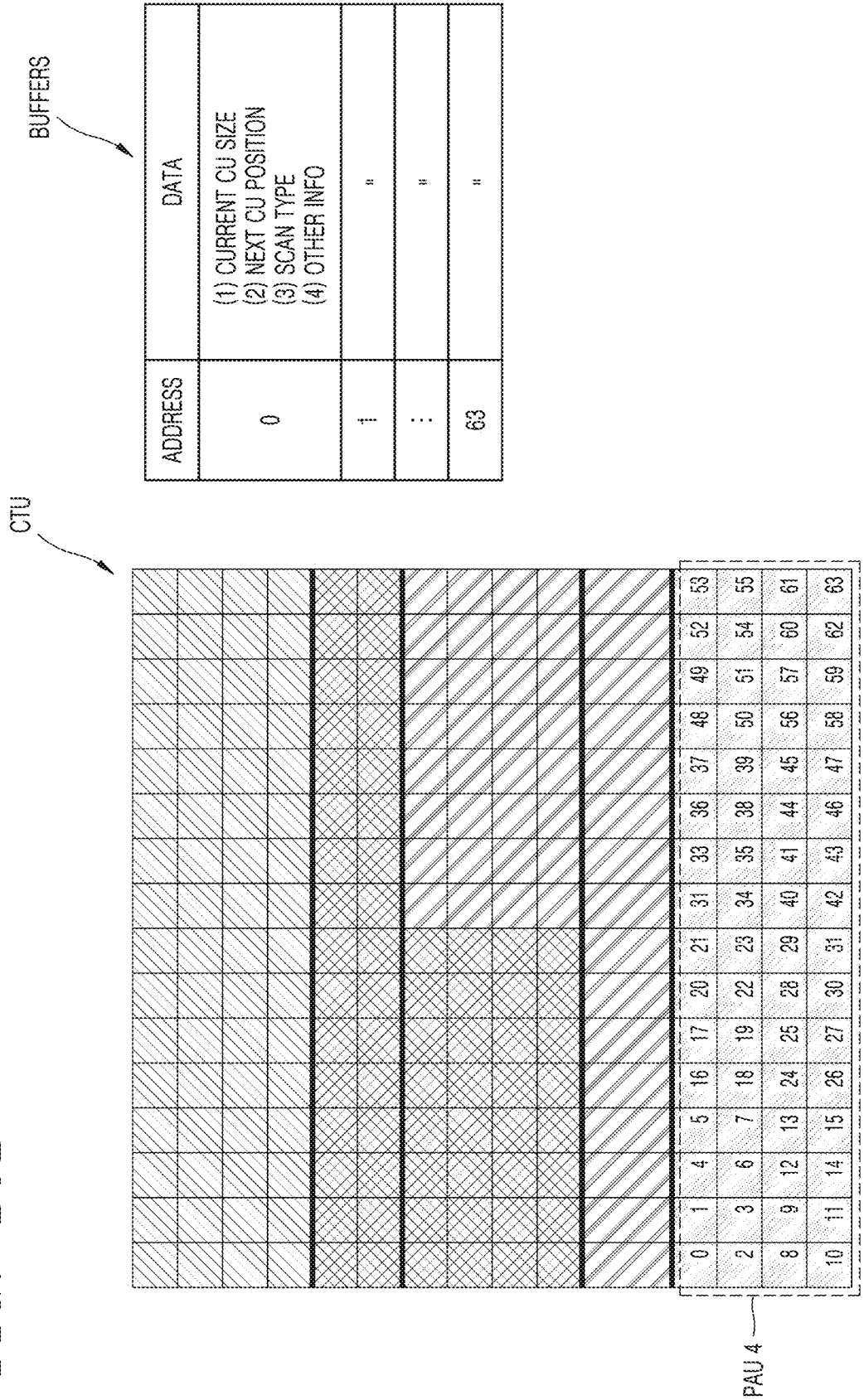

Referring to FIG. 10D, unit data (for example, the fourth unit data UD 4) of the fourth pipeline area unit PAU 4 may be processed in the fourth pipeline stage PSTG 4 and may be stored in a plurality of buffers (BUFFERS). The fourth unit data UD 4 may include fourth current CU size information, fourth next CU position information, and scan type information.

Figure 11:
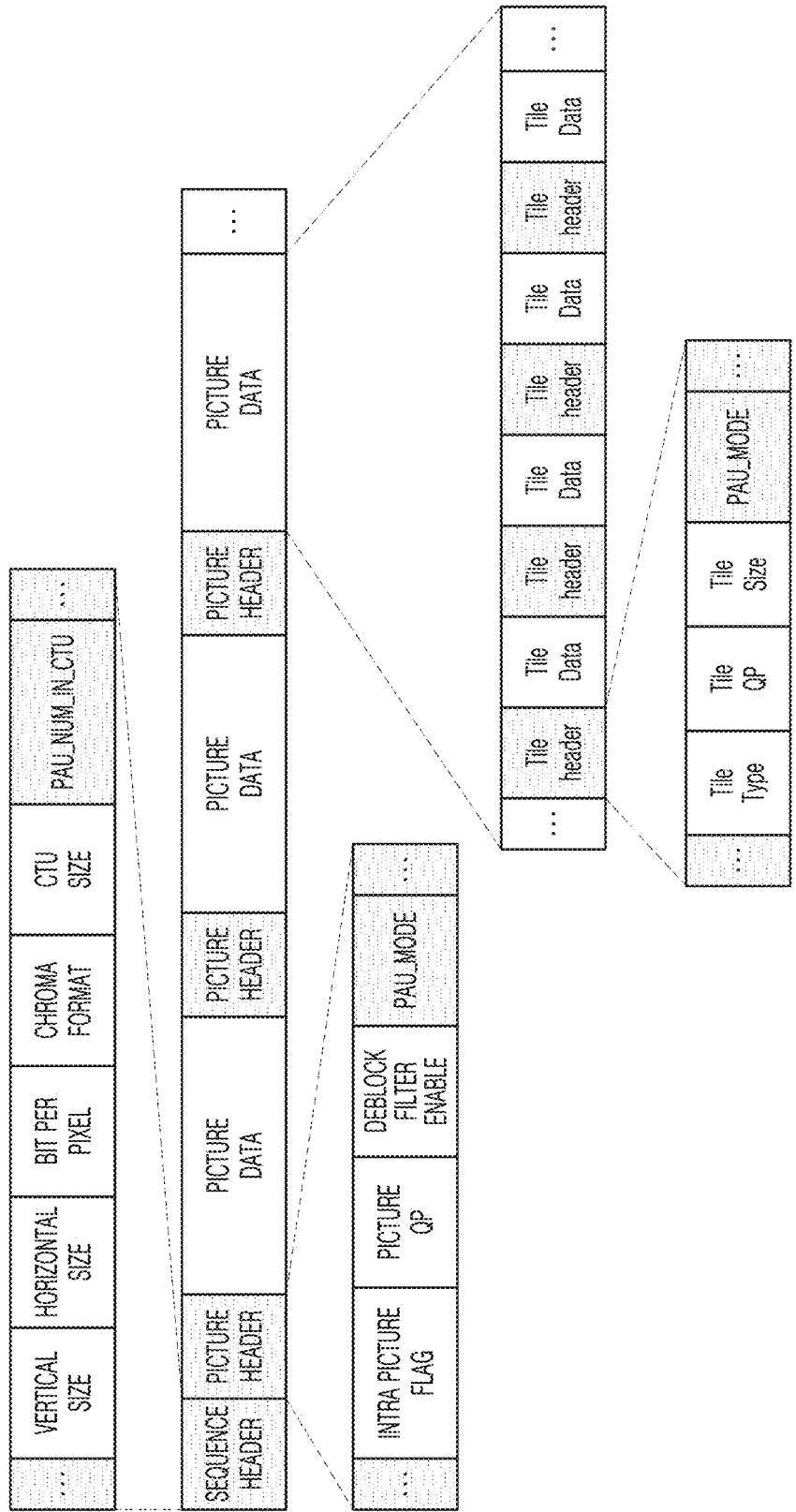
FIG. 11 is a diagram for describing a structure of a bitstream according to some embodiments.

FIG. 11 is a diagram for describing a structure of a bitstream according to some embodiments.

Referring to FIGS. 1 and 11, a bitstream BS generated by the video encoding device 100 may include sequence header information (SEQUENCE HEADER), picture header information (PICTURE HEADER), and picture information (PICTURE DATA). The picture header information (PICTURE HEADER) and the picture information (PICTURE DATA) may be repeated in the bitstream BS. The sequence header information (SEQUENCE HEADER), the picture header information (PICTURE HEADER), and the picture information (PICTURE DATA) may be pieces of information defined based on a video codec standard, and thus, descriptions thereof may be omitted.

In some embodiments, the sequence header information (SEQUENCE HEADER) may include vertical size information (VERTICAL SIZE), horizontal size information (HORIZONTAL SIZE), bit per pixel information (BIT PER PIXEL), chroma format information (CHROMA FORMAT), CTU size information (CTU SIZE), and pipeline area unit number information (PAU_NUM_IN_CTU). The vertical size information (VERTICAL SIZE), the horizontal size information (HORIZONTAL SIZE), the bit per pixel information (BIT PER PIXEL), the chroma format information (CHROMA FORMAT), and the CTU size information (CTU SIZE) may be pieces of information defined based on a video codec standard, and thus, descriptions thereof may be omitted. The pipeline area unit number information (PAU_NUM_IN_CTU) may include data representing the number of pipeline area units included in one CTU. For example, the pipeline area unit number information (PAU_NUM_IN_CTU) may represent the number (for example, "2", "4", "8", or the like) of pipeline area units included in one CTU. Embodiments of the pipeline area unit number information (PAU_NUM_IN_CTU) are described below with reference to FIG. 12.

In some embodiments, the picture header information (PICTURE HEADER) may include intra picture flag information (INTRA PICTURE FLAG), picture quantization parameter (QP) information (PICTURE QP), deblock filter enable information (DEBLOCK FILTER ENABLE), and pipeline area unit mode information (PAU_MODE). The intra picture flag information (INTRA PICTURE FLAG), the picture quantization parameter (QP) information (PICTURE QP), and the deblock filter enable information (DEBLOCK FILTER ENABLE) may be pieces of information defined based on a video codec standard, and thus, descriptions thereof may be omitted. The pipeline area unit mode information (PAU_MODE) may include data representing a method of dividing a pipeline area unit in one CTU. Embodiments of the pipeline area unit mode information (PAU_MODE) are described below with reference to FIG. 13.

In some embodiments, the picture information (PICTURE DATA) may include tile header information (TILE HEADER) and tile information (TILE DATA). The tile header information (TILE HEADER) and the tile information (TILE DATA) may be repeated in the picture information (PICTURE DATA). In an embodiment, the tile header information (TILE HEADER) may include tile type information (TILE TYPE), tile QP information (TILE QP), tile size information (TILE SIZE), and pipeline area unit mode information (PAU_MODE).

In some embodiments, when the bitstream BS includes pipeline area unit information (for example, the pipeline area unit number information (PAU_NUM_IN_CTU) and the pipeline area unit mode information (PAU_MODE)), a size of each of pipeline memories included in the decoder 210 may correspond to the pipeline area unit information. In an embodiment, a size of each pipeline memory may correspond to the maximum number of pipeline area units, a maximum size of a pipeline area unit in one CTU, and/or the maximum number of pipeline area units included in one CU.

In some embodiments, the pipeline area unit mode information (PAU_MODE) may be included in a field associated with a picture, a tile, or a CTU.

Although not shown, the bitstream BS may further include pipeline area size information representing a size (for example, "0: 16×16 pixels", "1: 32×32 pixels", or the like) of a pipeline area unit in one CTU.

Although not shown, the bitstream BS may further include sequence parameter information, picture parameter information, slice information, and transform information each including syntaxes used in each layer based on a hierarchical structure of an image.

FIG. 12 is a diagram for describing pipeline area unit number information according to some embodiments.

Referring to FIGS. 11 and 12, a value (VALUE OF PAU_NUM_IN_CTU) of the pipeline area unit number information (PAU_NUM_IN_CTU) may be represented as a 2-bit parameter. For example, the value (VALUE OF PAU_NUM_IN_CTU) of the pipeline area unit number information (PAU_NUM_IN_CTU) may be "0x00", "0x01", "0x02", or "0x03". However, embodiments are not limited thereto.

When the value (VALUE OF PAU_NUM_IN_CTU) of the pipeline area unit number information (PAU_NUM_IN_CTU) is "0x00", the number of pipeline area units (THE NUMBER OF PAU IN CTU) included in one CTU may be 1. This value may denote that the number of CTUs is the same as the number of PAUs and the CTUs correspond to the PAUs.

When the value (VALUE OF PAU_NUM_IN_CTU) of the pipeline area unit number information (PAU_NUM_IN_CTU) is "0x01", the number of pipeline area units (THE NUMBER OF PAU IN CTU) included in one CTU may be 2. This value may denote that one CTU includes two PAUs. That is, one CTU may be divided into two PAUs having the same area.

When the value (VALUE OF PAU_NUM_IN_CTU) of the pipeline area unit number information (PAU_NUM_IN_CTU) is "0x02", the number of pipeline area units (THE NUMBER OF PAU IN CTU) included in one CTU may be 4. This value may denote that one CTU includes four PAUs. That is, one CTU may be divided into four PAUs having the same area.

When the value (VALUE OF PAU_NUM_IN_CTU) of the pipeline area unit number information (PAU_NUM_IN_CTU) is "0x03", the number of pipeline area units (THE NUMBER OF PAU IN CTU) included in one CTU may be 8. This value may denote that one CTU includes eight PAUs. That is, one CTU may be divided into eight PAUs having the same area.

FIG. 13 is a diagram for describing pipeline area unit mode information (PAU_MODE) according to some embodiments.

Referring to FIG. 13, the pipeline area unit mode information (PAU_MODE) may represent a method of dividing a pipeline area unit in one CTU. In some embodiments, the pipeline area unit mode information (PAU_MODE) may denote a method of dividing one CTU into PAUs having a certain shape when a size of a CU is greater than that of a PAU.

For example with reference to FIG. 13, the pipeline area unit mode information (PAU_MODE) may include a quad mode (QUAD), a horizontal mode (HOR), a vertical mode (VER), and other mode (ELSE). However, embodiments are not limited thereto.

The quad mode (QUAD) may be a mode of dividing one CTU into pipeline area units having a square shape. For example, four pipeline area units may be included in one CTU, and a shape of each pipeline area unit may be a square shape.

The horizontal mode (HOR) may be a mode of dividing the one CTU into pipeline area units having a rectangular shape and a relatively long horizontal length. For example, two or more pipeline area units may be included in one CTU, and a shape of each pipeline area unit may be a rectangular shape where a width is longer than a height.

The vertical mode (VER) may be a mode of dividing one CTU into pipeline area units having a rectangular shape and a relatively long vertical length. For example, two or more pipeline area units may be included in one CTU, and a shape of each pipeline area unit may be a rectangular shape where a height is longer than a width.

The other mode (ELSE) may be a mode selected from among the quad mode (QUAD), the horizontal mode (HOR), and the vertical mode (VER) based on a shape of a CU. For example, when a horizontal length of a CU is the same as a vertical length of the CU, namely, when a shape of the CU is a square shape, the other mode (ELSE) may be the quad mode (QUAD) or the horizontal mode (HOR). As another example, when a horizontal length of a CU is longer than a vertical length of the CU, the other mode (ELSE) may be the vertical mode (VER). As another example, when a vertical length of a CU is longer than a horizontal length of the CU, the other mode (ELSE) may be the horizontal mode (HOR).

Figure 14:
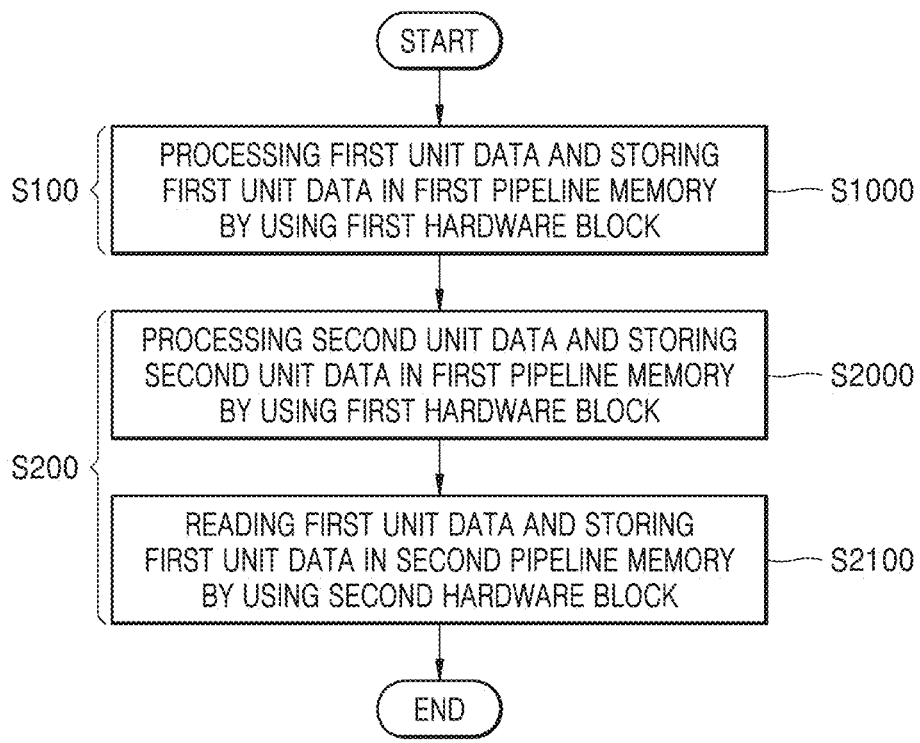
FIG. 14 is a flowchart for describing an operating method of a video decoding device, according to some embodiments.

FIG. 14 is a flowchart for describing an operating method of a video decoding device, according to some embodiments.

Referring to FIG. 14, the operating method of the video decoding device may include a first pipeline stage S100 and a second pipeline stage S200.

In the first pipeline stage S100, an operation of processing first unit data of a bitstream divided by pipeline units in the first pipeline stage and storing the first unit data in a first pipeline memory by using a first hardware block may be performed in operation S1000. Operation S1000 may be as described above with reference to FIG. 3A.

In a second pipeline stage S200 following the first pipeline stage S100 in time, an operation of processing second unit data divided by pipeline units in the second pipeline stage and storing the second unit data in the first pipeline memory by using the first hardware block may be performed in operation S2000. Simultaneously with operation S2000, an operation of reading and processing the first unit data stored in the first pipeline memory and storing the first unit data in a second pipeline memory by using a second hardware block may be performed in operation S2100. Operation S2000 and operation S2100 may be as described above with reference to FIG. 3B.

In some embodiments, in the first pipeline stage S100, an operation of reading unit data obtained through processing in a previous pipeline stage before the first pipeline stage, from the first pipeline memory and processing the unit data by using the second hardware block may be performed simultaneously with operation S1000. In an embodiment, the processed unit data may be stored in the second pipeline memory. In some embodiments, in the second pipeline stage S200, an operation of reading unit data stored in the second pipeline memory and processing the unit data by using a third hardware block may be performed simultaneously with operation S2000 and operation S2100.

In some embodiments, the operating method of the video decoding device may further include a third pipeline stage following the second pipeline stage S200. In the third pipeline stage, an operation of processing third unit data divided by pipeline units in the bitstream and storing the third unit data in the first pipeline memory by using the first hardware block, an operation of reading and processing the second unit data stored in the first pipeline memory and storing the processed second unit data in the second pipeline memory by using the second hardware block simultaneously, and an operation of reading and processing the first unit data stored in the second pipeline memory by using a third hardware block simultaneously may be performed. In other words, the operations of processing and storing the third unit data, reading, processing, and storing the second unit data, and reading, processing and storing the first unit data may all happen simultaneously.

As described above, since a decoding operation is performed by relatively small pipeline units regardless of a video compression scheme or a tree division mode, a size and a storage capacity of a pipeline memory may be reduced.

Figure 15:
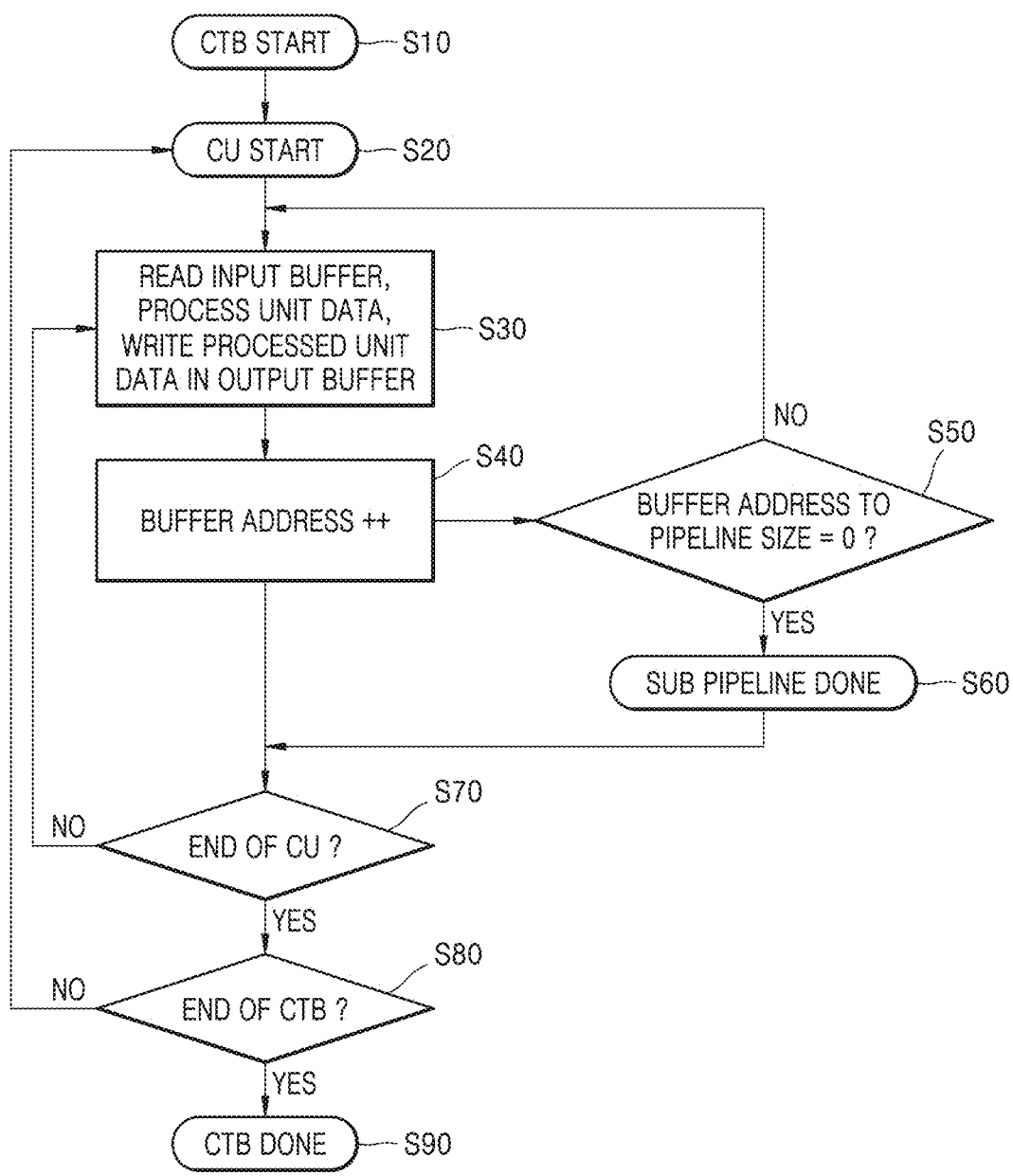
FIG. 15 is a flowchart for describing a method of processing unit data by pipeline units, according to some embodiments.

FIG. 15 is a flowchart for describing a method of processing unit data by pipeline units, according to some embodiments.

Referring to FIG. 15, a method of processing unit data by pipeline units illustrated in FIG. 15 may correspond to an operating method of each of pipeline memories and hardware blocks as described above with reference to FIGS. 2, 3A, 3B, 3C, 4, and 5.

In operation S10, a coding tree block (hereinafter referred to as a CTB) may start.

In operation S20, a CU included in one CTB may start.

In operation S30, a hardware block may read an input buffer, process unit data, and write the processed unit data in an output buffer. In some embodiments, the input buffer may be a buffer of a pipeline memory disposed at a front end of the hardware block. The output buffer may be a buffer of a pipeline memory disposed at a rear end of the hardware block. In some embodiments, reading the input buffer, processing the unit data, and writing the processed unit data in the output buffer may occur simultaneously.

In operation S40, a buffer address may increase. An increase in buffer address may denote that a number of a buffer address increases. Referring to FIG. 10A, an address number may increase from 1 to 2. However, embodiments are not limited thereto.

In operation S50, whether a ratio of a buffer address to a pipeline size is 1 may be determined. In some embodiments, the pipeline size may be a size of a pipeline memory, and for example, may be a storage capacity of the pipeline memory.

When a ratio of the buffer address to the pipeline size is not 1 (S50, No), operation S30 may be performed. When a ratio of the buffer address to the pipeline size is 1 (S50, Yes), a sub-pipeline may be completed in operation S60. The sub-pipeline may be a pipeline included in one CU.

In operation S70, an end or not of the CU may be determined. When the CU is not ended (S70, No), operation S30 may be performed. When the end of the CU is reached (S70, Yes), whether an end or not of a CTB may be determined in operation S80. When the CTB is not ended (S80, No), operation S20 may be performed. When the end of the CTB is reached (S80, Yes), the CTB may be completed in operation S90.

Figure 16:
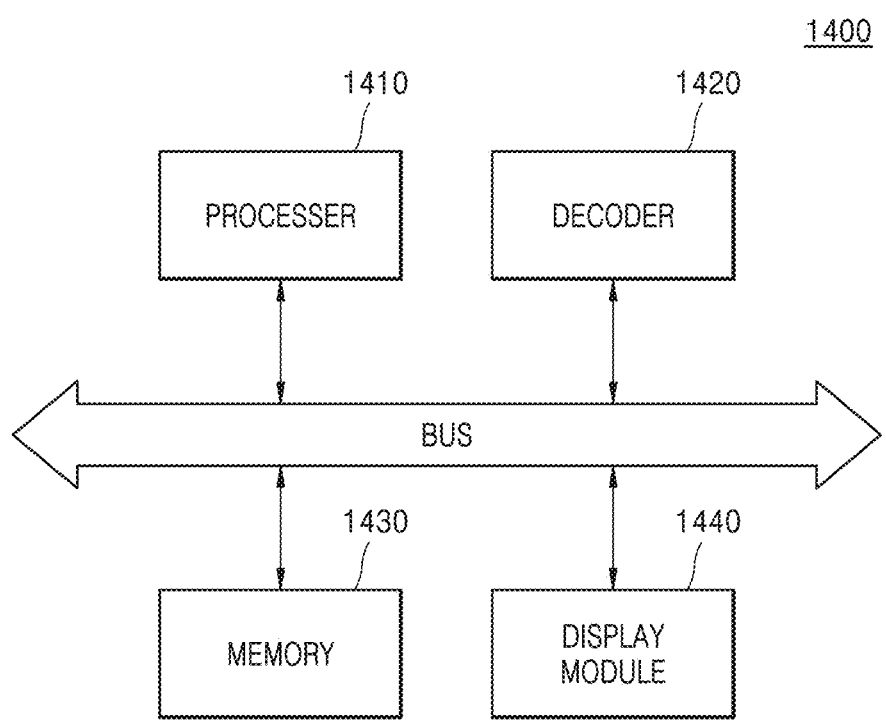
FIG. 16 is a block diagram of a display device according to some embodiments.

FIG. 16 is a block diagram of a display device 1400 according to some embodiments.

Referring to FIG. 16, the display device 1400 may include a mobile system such as a mobile phone, a smartphone, a tablet personal computer (PC), a wearable device, a healthcare device, or an Internet of things (IoT). However, the display device 1400 is not limited to the above description. The display device 1400 may include a PC, a laptop computer, a server, a media player, or an automotive device such as a navigation device.

The display device 1400 may include a processor 1410, a decoder 1420, a memory 1430, and a display module 1440.

The processor 1410 may control an overall operation of the display device, and in more detail, may control operations of the elements of the display device 1400. The processor 1410 may be implemented as a general-use processor, a dedicated processor, or an application processor.

The processor 1410 may include one or more central processing unit (CPU) cores. The processor 1410 may further include at least one controller for controlling the decoder 1420, the memory 1430, and the display module 1440.

The processor 1410 may further include an accelerator which is a dedicated circuit for a high-speed data operation such as an artificial intelligence (AI) data operation. The accelerator may include a graphics processing unit (GPU), a neural processing unit (NPU), and/or a data processing unit (DPU) and may be implemented as a separate chip which is physically independent of the other elements of the processor 1410.

The decoder 1420 and the memory 1430 may respectively correspond to the decoder 210 and the memory 220 each illustrated in FIG. 1.

The display module 1440 may function as an output device which outputs each visual information to a user. The display module 1440 may display an image based on image data obtained through decoding by the decoder 1420.

Various embodiments have been described and are not intended to limit the present disclosure. The scope of the present disclosure is not limited by the various embodiments. Rather, the scope of the present disclosure has to be construed by the appended claims, and all spirits within an equivalent range have to be construed as being included in the scope of the present disclosure.

Hereinabove, exemplary embodiments have been described in the drawings and the specification. Embodiments have been described by using the terms described herein, but these terms have been merely used for describing the various embodiments and have not been used for limiting a meaning or limiting the scope of the present disclosure defined in the following claims. Therefore, it may be understood by those of ordinary skill in the art that various modifications and other equivalent embodiments may be implemented from the various embodiments. Accordingly, the spirit and scope of the present disclosure may be defined based on the spirit and scope of the following claims.

While various embodiments have been particularly shown and described with reference to the drawings, it will be understood that various changes in form and details may be made therein without departing from the spirit and scope of the following claims.

What is claimed is:

1. A video decoding device comprising:
   a decoder including a plurality of hardware blocks and a plurality of pipeline memories, the plurality of hardware blocks being configured to perform decoding processing in a plurality of pipeline stages on a bitstream divided into unit data, each hardware block being configured, during each pipeline stage, to process a unit data and to output a processed unit data, each of the plurality of pipeline memories disposed between two adjacent hardware blocks of the plurality of hardware blocks and configured to store a processed unit data output by a first adjacent hardware block of the two adjacent hardware blocks and to output the processed unit data to a second adjacent hardware block of the two adjacent hardware blocks; and a memory configured to store image data decoded by the decoder, wherein each unit data corresponds to a pipeline area unit and comprises current coding unit (CU) size information representing a size of a current CU including unit pixel groups corresponding to the pipeline area unit among a plurality of unit pixel groups included in a coding tree unit (CTU) of a plurality of CTUs, next CU position information representing a position of a CU next to the current CU including the unit pixel groups corresponding to the pipeline area unit, and scan type information representing a scan type of a unit pixel group, the plurality of CTUs forming a picture, each unit pixel group comprising a plurality of pixels, and the pipeline area unit corresponding to a number of unit pixel groups, wherein each of the plurality of pipeline memories comprises a plurality of buffers having a plurality of buffer addresses corresponding to the unit pixel groups corresponding to the pipeline area unit.

2. The video decoding device of claim 1, wherein the plurality of hardware blocks comprise a first hardware block and a second hardware block, and the plurality of pipeline memories comprise a first pipeline memory configured to store first unit data processed by the first hardware block and store second unit data which is to be provided to the second hardware block.

3. The video decoding device of claim 2, wherein the first hardware block is configured to store the first unit data processed by the first hardware block in the first pipeline memory, and simultaneously, the second hardware block is configured to process the second unit data.

4. The video decoding device of claim 2, wherein the first pipeline memory comprises:

a first memory configured to store the first unit data; and
a second memory configured to store the second unit data.

5. The video decoding device of claim 4, wherein, in a first pipeline stage, the first hardware block is configured to store the first unit data in the first memory, and the second hardware block is configured to read the second unit data from the second memory, and in a second pipeline stage immediately following the first pipeline stage in time, the first hardware block is configured to store new unit data in the second memory, and the second hardware block is configured to read the first unit data from the first memory.

6. The video decoding device of claim 1, wherein the plurality of hardware blocks comprise a first hardware block and a second hardware block, and the first hardware block is configured to store the unit data of the bitstream in a pipeline memory between the first hardware block and the second hardware block among the plurality of pipeline memories.

7. The video decoding device of claim 1, wherein the plurality of hardware blocks comprise:

a bitstream parsing block configured to parse the bitstream;

an inverse quantization transformation (IQT) block configured to inversely quantize a parsed bitstream and perform inverse transformation on an inversely quantized result;

a motion vector block configured to generate a motion vector based on the parsed bitstream;

an intra mode block configured to generate a prediction block based on the motion vector;

a motion compensation block configured to perform motion compensation, based on the motion vector;

an inter prediction block configured to perform inter prediction, based on the motion vector;

an intra prediction and recon block configured to perform intra prediction, based on the motion vector, the prediction block, and a performance result of the inter prediction; and a loop filter block configured to store the image data in the memory.

8. The video decoding device of claim 7, wherein the plurality of pipeline memories comprise:

a first pipeline memory disposed between the bitstream parsing block and the IQT block;

a second pipeline memory disposed between the bitstream parsing block and the motion vector block;

a third pipeline memory disposed between the IQT block and the intra prediction and recon block;

a fourth pipeline memory disposed between the motion vector block and the intra mode block;

a fifth pipeline memory disposed between the motion vector block and the motion compensation block;

a sixth pipeline memory disposed between the intra mode block and the intra prediction and recon block;

a seventh pipeline memory disposed between the motion compensation block and the inter prediction block;

an eighth pipeline memory disposed between the inter prediction block and the intra prediction and recon block; and a ninth pipeline memory disposed between the intra prediction and recon block and the loop filter block.

9. An operating method of a video decoding device, the operating method comprising:

during a first pipeline stage,
processing first unit data of a bitstream which is divided by pipeline units in the first pipeline stage and storing the first unit data in a first pipeline memory by a first hardware block; and during a second pipeline stage immediately following the first pipeline stage in time,
processing second unit data divided by pipeline units in the second pipeline stage and storing the second unit data in the first pipeline memory by the first hardware block; and
simultaneously with processing the second unit data by the first hardware block, reading and processing the first unit data stored in the first pipeline memory by a second hardware block, wherein each of the first unit data and the second unit data corresponds to a pipeline area unit and comprises current coding unit (CU) size information representing a size of a current CU including unit pixel groups corresponding to the pipeline area unit among a plurality of unit pixel groups included in a coding tree unit (CTU) of a plurality of CTUs and next CU position information representing a position of a CU next to the current CU including the unit pixel groups corresponding to the pipeline area unit, and wherein the plurality of CTUs form a picture, each unit pixel group comprises a plurality of pixels, and the pipeline area unit corresponds to a number of unit pixel groups, and wherein the first pipeline memory comprises a plurality of buffers having a plurality of buffer addresses corresponding to the unit pixel groups corresponding to the pipeline area unit.

10. The operating method of claim 9, further comprising, during the first pipeline stage, simultaneously with storing the first unit data by the first hardware block, reading unit data, obtained through processing during a previous pipeline stage that is previous in time to the first pipeline stage, from the first pipeline memory and processing the unit data by the second hardware block.

11. The operating method of claim 10, wherein, during the first pipeline stage, the processing of the unit data comprises storing the unit data in a second pipeline memory,
during the second pipeline stage, the processing of the first unit data comprises storing the first unit data in the second pipeline memory, and
during the second pipeline stage, simultaneously with storing the first unit data, reading and processing unit data previously stored in the second pipeline memory by a third hardware block.

12. The operating method of claim 11, further comprising:
during a third pipeline stage immediately following the second pipeline stage in time,
processing third unit data divided by pipeline units in the bitstream and storing the third unit data in the first pipeline memory by using the first hardware block;
simultaneously with processing the third unit data, reading and processing the second unit data stored in the first pipeline memory and storing the second unit data in the second pipeline memory by using the second hardware block; and
simultaneously with processing the third unit data and the reading and the processing the second unit data, reading and processing the first unit data stored in the second pipeline memory by using the third hardware block.

13. The operating method of claim 9, wherein, during the second pipeline stage, the processing of the first unit data comprises storing the first unit data in a second pipeline memory;
during a third pipeline stage immediately following the second pipeline stage in time, processing third unit data divided by pipeline units in the third pipeline stage and storing the third unit data in the first pipeline memory by the first hardware block;
simultaneously with processing and storing the third unit data, reading and processing the second unit data stored in the first pipeline memory and storing the second unit data in the second pipeline memory by the second hardware block; and
simultaneously with reading and processing the second unit data, reading and processing the first unit data stored in the second pipeline memory by a third hardware block simultaneously.

14. The operating method of claim 9, wherein the first unit data comprises first current coding unit (CU) size information representing a size of a first current CU including first unit pixel groups corresponding to a first pipeline area unit among the plurality of unit pixel groups included in the coding tree unit (CTU), first next CU position information representing a position of a CU next to the first current CU including the first unit pixel groups corresponding to the first pipeline area unit, and scan type information representing a scan type of a unit pixel group, and the second unit data comprises second current CU size information representing a size of a second current CU including second unit pixel groups corresponding to a second pipeline area unit different from the first pipeline area unit among the plurality of unit pixel groups, second next CU position information representing a position of a CU next to the second current CU including the second unit pixel groups corresponding to the second pipeline area unit, and the scan type information.

15. A video system comprising:
a video encoding device configured to provide a bitstream including pipeline area unit information about a pipeline area unit; and
a video decoding device configured to decode the bitstream and output decoded image data,
wherein the video decoding device comprises:
a plurality of hardware blocks configured to process unit data divided by pipeline units; and
a plurality of pipeline memories each having a memory size corresponding to the pipeline area unit information, the plurality of pipeline memories being configured to store the unit data that is processed,
wherein each unit data corresponds to a pipeline area unit and comprises current coding unit (CU) size information representing a size of a current CU including a unit pixel group corresponding to the pipeline area unit among a plurality of unit pixel groups included in a coding tree unit (CTU) of a plurality of CTUs and next CU position information representing a position of a CU next to the current CU including the unit pixel groups corresponding to the pipeline area unit, and
wherein the plurality of CTUs form a picture, each unit pixel group comprises a plurality of pixels, and the pipeline area unit corresponds to a number of unit pixel groups, and
wherein each of the plurality of pipeline memories comprises a plurality of buffers having a plurality of buffer addresses corresponding to the unit pixel groups corresponding to the pipeline area unit.

16. The video system of claim 15, wherein the pipeline area unit information comprises pipeline area unit number information representing a number of pipeline area units included in one coding tree unit (CTU).

17. The video system of claim 16, wherein the pipeline area unit information further comprises pipeline area unit mode information representing a method of dividing one CTU into the pipeline area units.

18. The video system of claim 17, wherein the pipeline area unit mode information comprises a quad mode of dividing the one CTU into pipeline area units having a square shape, a horizontal mode of dividing the one CTU into pipeline area units having a relatively long horizontal length and a rectangular shape, and a vertical mode of dividing the one CTU into pipeline area units having a relatively long vertical length and a rectangular shape.

19. The video system of claim 15, wherein the unit data comprises current coding unit (CU) size information representing a size of a current CU including unit pixel groups corresponding to the pipeline area unit among a plurality of unit pixel groups included in one coding tree unit (CTU), next CU position information representing a position of a CU next to the current CU including the unit pixel groups, and scan type information representing a scan type of a unit pixel group.

* * * * *